(12) United States Patent
Wright et al.

(10) Patent No.: US 8,752,390 B2
(45) Date of Patent: Jun. 17, 2014

(54) METHOD AND APPARATUS FOR PRODUCING POWER AND HYDROGEN

(75) Inventors: Andrew David Wright, Guildford (GB); Jeffrey Raymond Hufton, Fogelsville, PA (US); Vincent White, Ashtead (GB); Timothy Christopher Golden, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 976 days.

(21) Appl. No.: 12/835,084

(22) Filed: Jul. 13, 2010

(65) Prior Publication Data
US 2012/0011856 A1    Jan. 19, 2012

(51) Int. Cl.
  *F02C 6/18*  (2006.01)
  *F02C 3/28*  (2006.01)
  *B01D 59/26*  (2006.01)
  *B01D 53/047*  (2006.01)

(52) U.S. Cl.
  USPC ........... 60/780; 60/39.461; 60/39.465; 95/96; 95/136; 95/139; 96/121; 96/131; 96/132

(58) Field of Classification Search
  USPC .............. 60/39.461, 39.465, 780; 95/96, 136, 95/139; 96/121, 131, 132
  See application file for complete search history.

(56) References Cited

U.S. PATENT DOCUMENTS

| | | | |
|---|---|---|---|
| 3,102,013 | A | 8/1963 | Skarstrom |
| 4,042,349 | A | 8/1977 | Baudouin et al. |
| 4,171,206 | A | 10/1979 | Sircar |
| 4,539,020 | A | 9/1985 | Sakuraya et al. |
| 4,696,680 | A | 9/1987 | Ghate et al. |
| 4,761,167 | A | 8/1988 | Nicholas et al. |
| 4,790,858 | A | 12/1988 | Sircar |
| 4,813,980 | A | 3/1989 | Sircar |

(Continued)

FOREIGN PATENT DOCUMENTS

| | | |
|---|---|---|
| EP | 1 547 971 A2 | 6/2005 |
| EP | 1 816 103 A2 | 8/2007 |

(Continued)

OTHER PUBLICATIONS

Kloosterman et al; "Method of Treating a Gaseous Mixture Comprising Hydrogen, Carbon Dioxide and Hydrogen Sulphide" U.S. Appl. No. 12/835,063, filed Jul. 13, 2010.

(Continued)

*Primary Examiner* — Ehud Gartenberg
*Assistant Examiner* — Karthik Subramanian
(74) *Attorney, Agent, or Firm* — Willard Jones II

(57) ABSTRACT

Both power and $H_2$ are produced from a gaseous mixture, comprising $H_2$ and $CO_2$, using first and second pressure swing adsorption (PSA) systems in series. The gaseous mixture is fed at super-atmospheric pressure to the first PSA system, which comprises adsorbent that selectively adsorbs $CO_2$ at said pressure, and $CO_2$ is adsorbed, thereby providing an $H_2$-enriched mixture at super-atmospheric pressure. A fuel stream is formed from a portion of the $H_2$-enriched mixture, which is combusted and the combustion effluent expanded to generate power. Another portion of the $H_2$-enriched mixture is sent to the second PSA system, which comprises adsorbent that selectively adsorbs $CO_2$ at super-atmospheric pressure, and $CO_2$ is adsorbed, thereby providing a high purity $H_2$ product. In preferred embodiments, the division of $H_2$-enriched mixture between forming the fuel stream and being fed to the second PSA system is adjustable.

21 Claims, 3 Drawing Sheets

(56) References Cited

U.S. PATENT DOCUMENTS

| | | | |
|---|---|---|---|
| 4,836,833 A | 6/1989 | Nicholas et al. | |
| 5,133,785 A | 7/1992 | Kumar et al. | |
| 6,245,127 B1* | 6/2001 | Kane et al. | 95/101 |
| 6,340,382 B1 | 1/2002 | Baksh et al. | |
| 6,500,241 B2* | 12/2002 | Reddy | 96/134 |
| 7,354,562 B2 | 4/2008 | Ying et al. | |
| 7,550,030 B2 | 6/2009 | Kumar | |
| 7,618,478 B2* | 11/2009 | Kumar | 95/100 |
| 7,618,606 B2* | 11/2009 | Fan et al. | 423/230 |
| 2007/0178035 A1 | 8/2007 | White et al. | |
| 2007/0199446 A1 | 8/2007 | Golden et al. | |
| 2007/0227353 A1 | 10/2007 | Kumar | |
| 2008/0072752 A1* | 3/2008 | Kumar | 95/103 |
| 2008/0190026 A1 | 8/2008 | De Jong et al. | |
| 2009/0013870 A1* | 1/2009 | Sorensen et al. | 95/96 |
| 2009/0159494 A1* | 6/2009 | Gautam et al. | 208/58 |
| 2010/0000407 A1* | 1/2010 | Gouman et al. | 95/93 |
| 2010/0011955 A1 | 1/2010 | Hufton et al. | |

FOREIGN PATENT DOCUMENTS

| | | |
|---|---|---|
| EP | 2 145 665 A2 | 1/2010 |
| EP | 1006079 | 4/2010 |
| FR | 2899890 | 10/2007 |
| WO | 2005118126 | 12/2005 |
| WO | 2008/024449 A2 | 2/2008 |
| WO | 2010059055 | 5/2010 |

OTHER PUBLICATIONS

Wright et al; "Separation of a Sour Syngas Stream" U.S. Appl. No. 12/835,112, filed Jul. 13, 2010.

* cited by examiner

METHOD AND APPARATUS FOR PRODUCING POWER AND HYDROGEN

BACKGROUND OF THE INVENTION

The present invention relates to methods and apparatus for producing power and hydrogen ($H_2$) from a gaseous mixture comprising $H_2$ and carbon dioxide ($CO_2$), and in particular for concurrently and/or adjustably producing electric power and a high purity hydrogen product (preferably having a purity of at least about 99.9 mole %, more preferably at least about 99.99 mole %) from a gaseous mixture obtained from gasification of or from reforming a carbonaceous feedstock.

Gasification of a solid or liquid carbonaceous feedstock, or partial oxidation or steam methane reforming of a gaseous or liquid carbonaceous feedstock, followed by subsequent separation of hydrogen from the gasifier or reformer effluent, is a well known technique of producing hydrogen, and has been a topic of research and development for many years. As is also known, the separated hydrogen product may then be put to a number of uses, depending on its purity. For example, hydrogen may be used as a fuel in for example a gas turbine, thereby generating power (in particular electric power), and/or it may be used in refinery, chemicals and/or fuel cell applications. Where the hydrogen product is to be used as a fuel for a gas turbine for generating power, a somewhat lower purity is typically acceptable than that which is required where the hydrogen product is intended for refinery, chemicals or fuel cell applications (all of which typically require an $H_2$ purity of at least 99.9 mole %, and more typically at least 99.99 mole %).

Gasifier or reformer effluent typically comprises $H_2$, $CO_2$ and carbon monoxide (CO) as the major components, with minor amounts of other components such as methane ($CH_4$), ammonia ($NH_3$), nitrogen ($N_2$), argon (Ar) and, where the feedstock contained sulphur, certain sulphur containing species (predominantly hydrogen sulphide ($H_2S$), but other species such as carbonyl sulphide (COS) and carbon disulphide ($CS_2$) may to a lesser extent also be present). This effluent is often then subjected to a water-gas-shift reaction to convert, by reaction with $H_2O$, some or all of the CO to $CO_2$ and $H_2$. In circumstances where any sulphur containing species are not first removed by appropriate sorptive techniques (as may be necessary where a sulphur sensitive shift catalyst is to be used) this can have the side-effect of also increasing the concentration of $H_2S$ in the shifted mixture, due to conversion of other sulphur species in the crude syngas stream to $H_2S$ during the water-gas-shift reaction.

If an $H_2$ product suitable for use as a fuel for generating power or for use in refinery, chemicals or fuel cell applications is desired, further separation of the $H_2$ from the other components of the gasifier, reformer or shift-converter effluent will typically then be required. An array of technologies for the separation of $H_2$ from such mixtures, and from other mixtures comprising $H_2$ and $CO_2$, have been developed and are known. One approach is to utilize pressure swing adsorption (PSA), and a variety of methods adopting this approach have been described in the art.

For example, US-A1-2007/0178035 describes a method of treating a gaseous mixture, such as obtained from a gasification process, comprising $H_2$, $CO_2$ and one or more combustible gases (i.e. $H_2S$, CO and $CH_4$). $H_2$ is separated, preferably by pressure swing adsorption (PSA), from the gaseous mixture to produce a separated high purity $H_2$ gas and a crude $CO_2$ gas comprising the combustible gases. The crude $CO_2$ gas is combusted to produce heat and a $CO_2$ product gas comprising the combustion products of the combustible gas(es). Heat is recovered from the $CO_2$ product gas by indirect heat exchange with the $H_2$ gas, to which a diluent (e.g. $N_2$ or $H_2O$) may have been added, and the warmed $H_2$-containing gas may then be fed as fuel to a gas turbine. Where the combustion product(s) comprise $SO_x$ ($SO_2$ and $SO_3$), these may be removed by a process that involves washing the gas with water and maintaining the gas at elevated pressure.

U.S. Pat. No. 4,171,206 describes a method in which two PSA systems, each comprising a plurality of adsorbent beds operating in parallel, are used in series to separate a high purity $H_2$ product and a $CO_2$ product from a feed gas comprising $H_2$ and $CO_2$ and one or more dilute components, such as CO and $CH_4$. The feed gas may for example be produced from a shift converter in a hydrocarbon reforming plant. The feed gas is fed to the first PSA system at super-atmospheric pressure, and $CO_2$ is adsorbed. The unadsorbed gas pushed through the first PSA system is then fed to the second PSA system where the dilute components are adsorbed, and the unadsorbed gas pushed through the second PSA system is withdrawn as high purity $H_2$ product. The first PSA system employs a vacuum pressure swing adsorption process, whereby the desorbed gas obtained at ambient and sub-ambient pressures during blowdown and evacuation of the beds of the first PSA system is withdrawn as high purity $CO_2$ product. The desorbed gas obtained at about ambient pressure during blowdown/purging of the beds of the second PSA system is withdrawn as a product containing $H_2$, CO and $CH_4$ and having good fuel value.

U.S. Pat. No. 4,790,858, U.S. Pat. No. 4,813,980, U.S. Pat. No. 4,836,833, U.S. Pat. No. 5,133,785 describe a number of modifications to or variations on the method described in U.S. Pat. No. 4,171,206. U.S. Pat. No. 4,790,858 describes a method in which the product containing $H_2$, CO and $CH_4$ obtained at atmospheric pressure from the second PSA system is compressed and fed to a third PSA system, so as to recover some of the $H_2$ present in said feed as further high purity $H_2$ product. U.S. Pat. No. 4,813,980 describes the use of first and second PSA systems to separate a reformer off-gas, comprising $H_2$, $N_2$, $CO_2$ and minor quantities of $CH_4$, CO and Ar, into a high purity ammonia synthesis gas (e.g. a product comprising a 3:1 ratio of $H_2$ to $N_2$), a high purity $CO_2$ product, and a product containing $H_2$, $CH_4$ and CO that can be used as fuel for the reformers. U.S. Pat. No. 4,836,833 describes a method in which the feed to the first PSA system is the reformate from a steam methane reformer, and the desorbed product obtained from the second PSA system contains CO, $H_2$ and minor amounts of $CH_4$ and is further separated in a multi-membrane system to obtain a high purity CO product. U.S. Pat. No. 5,133,785 describes certain modifications to the PSA cycle described in U.S. Pat. No. 4,171,206 for operation of the first and second PSA systems.

U.S. Pat. No. 3,102,013 discloses a method of separating a mixture of at least three components, designated A, B and C, using at least two PSA beds in series. The mixture is fed to the first bed at high pressure, where component C is adsorbed, and the unadsorbed gas pushed through the first bed is fed to the second bed, where component B is selectively adsorbed, thereby obtaining a product comprising component A. A portion of this product is used to purge the beds at low pressure. The gas purged from the first bed comprises components A and C and the gas purged from the second bed comprises components A and B. These purged gases are then separated in further separation beds into components A and C and A and B, respectively.

U.S. Pat. No. 4,042,349 discloses methods of separating mixtures using two or more PSA beds in series and/or in parallel. In one embodiment two beds are used in series, and in parallel with two further beds in series, to separate an $H_2$ stream from a feed mixture comprising $H_2$, $N_2$, $CH_4$, Ar and $NH_3$.

U.S. Pat. No. 4,539,020 discloses a method of separating CO from a feed gas comprising $CO_2$, CO and a less adsorbable component than CO, such as $N_2$, $H_2$ or $CH_4$, through PSA using in series at least two adsorbent beds. The first bed selectively adsorbs $CO_2$ from the feed gas, and the $CO_2$ depleted gas pushed through the first bed is fed to the second bed which selectively adsorbs CO. The gas pushed through the second bed comprises CO and the less adsorbable components and can be used for purging the first bed, with the remainder being usable as a fuel in view of its considerable CO content. The gas evacuated from the second bed under vacuum forms the high purity CO product. In one example, the process is used to separate a gaseous mixture comprising CO, $CO_2$, $N_2$, $H_2$ and $O_2$ which is an off-gas from a converter furnace.

U.S. Pat. No. 4,696,680 describes a method for bulk separation of a gaseous mixture, comprising predominantly $H_2$, CO, $CH_4$, $CO_2$ and $H_2S$, derived from the gasification of coal. In one embodiment, the gaseous mixture is fed at about atmospheric pressure to a first PSA bed which selectively adsorbs $CO_2$ and $H_2S$. The non-adsorbed gas, which comprises $H_2$, CO and $CH_4$, from the first PSA bed is compressed and fed to a second PSA bed at a pressure at which $H_2$, CO and $CH_4$ are all adsorbed. The pressure in the second PSA bed is then gradually decreased to sequentially desorb a high purity $H_2$ product, a CO enriched product and a $CH_4$ enriched product. The first PSA bed is regenerated by desorbing the $CO_2$ and $H_2S$ at sub-atmospheric pressure. The CO and $CH_4$ enriched products may be utilized as a mixture for providing fuel gas.

U.S. Pat. No. 4,761,167 describes a method of removing $N_2$ from a fuel gas stream comprising $CH_4$, $N_2$ and $CO_2$. The fuel gas stream is fed to a PSA system, comprising a plurality of adsorbent beds employed in parallel that selectively adsorb $CO_2$ from a mixture. The unsorbed effluent, consisting substantially of $CH_4$ and $N_2$, exiting the PSA system is then fed to a Nitrogen Rejection Unit (NRU) that separates the $N_2$ from the $CH_4$ by fractional distillation. The nitrogen stream obtained from the NRU can then be used for purging the beds of the PSA system during regeneration of the beds at atmospheric pressure.

U.S. Pat. No. 6,340,382 describes the design and operation of a PSA system for producing a high purity ($\geq$99.9%) $H_2$ product from a gas stream containing more than about 50 mole % $H_2$, such as streams that contain from 60 to 90 mole % $H_2$ and include $CO_2$, $H_2O$, $CH_4$, $N_2$ and CO. The document also cross-references a number of previous works on PSA cycles and adsorbent options for producing high purity $H_2$.

US2007/0199446 describes a vacuum pressure swing adsorption (VPSA) process for producing an essentially CO-free hydrogen gas stream from a high-purity, e.g. pipeline grade, hydrogen gas stream using one or two adsorber beds. The high-purity hydrogen gas stream consists of about 99.9% by volume $H_2$ with up to about 1000 ppm of non-hydrogen impurities, and the essentially CO-free hydrogen gas stream contains less than 1 ppm CO. The PSA process uses physical adsorbents with high heats of nitrogen adsorption, intermediate heats of carbon monoxide adsorption, and low heats of hydrogen adsorption, and uses vacuum purging, high feed stream pressures (e.g. feed pressures of as high as around 1,000 bar (100 MPa)) and feed times of greater than around 30 minutes to produce the essentially CO-free hydrogen from the pipeline grade hydrogen.

US-A1-2007/0227353 describes a method of separating a $CO_2$ product having a purity of at least 80 mole % from a feed stream containing at least $CO_2$ and $H_2$ via VPSA. The feed may for example be a syngas stream, obtained from steam methane reforming and shift-converting natural gas, which is fed to the VPSA unit at super-atmospheric pressure. The $H_2$-enriched unsorbed effluent is sent to a second PSA unit where it is further separated to obtain high-pressure, high purity $H_2$ product. The gas desorbed from the VPSA unit at sub-atmospheric pressure is withdrawn as the $CO_2$ product, and the gas desorbed from the second PSA unit may be used as a fuel stream for the steam methane reformer.

U.S. Pat. No. 7,550,030 and US-A1-2008/0072752 describe variations on the method described in US-A1-2007/0227353. In the method of U.S. Pat. No. 7,550,030, a third stream is obtained from the VPSA unit, which stream is an $H_2$-depleted stream (relative to the feed to the VPSA unit) which is formed from gas desorbed from the beds of the VPSA during depressurization of the beds prior to evacuation of the beds at sub-atmospheric pressure. This $H_2$-depleted stream may then be mixed with gas desorbed from the second PSA unit, to form a combined fuel stream for the steam methane reformer, or may be sent to an incinerator or vented. In the method of US-A1-2008/0072752, a stream formed from gas desorbed from the beds of the VPSA unit during depressurization of the beds prior to evacuation of the beds at sub-atmospheric pressure is recycled into the fresh feed to the VPSA unit.

WO2005/118126 describes a method of producing high purity hydrogen, in which a hydrocarbon feed is reformed at high pressure in a partial-oxidation or steam-methane reformer to produce a high pressure effluent containing $H_2$ which is separated in a PSA unit to produce a high purity product stream (i.e. 98 volume % $H_2$ or higher). The $H_2$ containing gas purged from the PSA unit may be combusted to heat the feed air to the reformer. Where the hydrocarbon feed is a sour feed (i.e. contains $H_2S$), an $H_2S$ sorber, containing for example a sorbent such as zinc oxide, may be used to remove $H_2S$ from the reformer effluent prior to separation in the PSA unit.

FR2899890 describes a PSA process for producing a $H_2$ product (98-99.5 mole % purity) from a feed gas containing hydrogen, in which the gas used to purge the beds of the PSA unit during the purge step of the PSA process is an $H_2$ rich gas which is at least partly obtained from an external source, such as from a petrochemical or oil unit in an oil refinery.

It is an objective of preferred embodiments of the present invention to provide efficient and flexible production of both power and hydrogen from a gaseous mixture comprising $H_2$ and $CO_2$, such as for example a mixture obtained from gasification of or reforming hydrocarbon feedstock.

Operation of a plant to make both a high purity $H_2$, for example for selling to a customer, and a lower purity $H_2$ stream for use as a fuel for making power by combustion in, for example, a gas turbine, can be desirable for a number of reasons. In particular, having the capability to make both electric power and high purity $H_2$ has the potential for significant cost advantages. Due to economies of scale, the incremental capital and operating cost of making power alongside high purity $H_2$ is potentially significantly less than that for making the same amount of power and/or high purity $H_2$ in standalone plants.

There can also be advantages in having the flexibility to vary production between a high purity $H_2$ for sale and a lower purity $H_2$ for use as a fuel for making power. For example, the price of electric power can vary considerably, with peaks and troughs in demand depending upon factors such as the time of the day or the season. There could therefore be commercial benefit in being able to turn down or turn off gas turbines when the price of electric power is low and ramp up the production of high purity $H_2$ when it can be sold at a higher price than power. Likewise, when the price of electric power is high it could be commercially beneficial to be able reduce or halt production of high purity $H_2$ in order to increase production of electric power.

In addition, there may be circumstances in which the source of the gaseous mixture (from which both power and $H_2$ are to be produced) cannot be completely relied upon. For example, in circumstances where the gaseous mixture is obtained from gasification of a carbonaceous feedstock by several gasifiers, it may be that one or more gasifiers, which are known to be somewhat unreliable, suddenly and unexpectedly fail during normal operation. Where the plant ordinarily produces both power and high purity $H_2$ and has the ability to vary production of the same, the plant operator may at least have the option of reducing or ceasing production of power or high purity $H_2$ in order that desired levels of production of the other are maintained. For example, where high purity $H_2$ is required for continuous supply to a customer, the ability to maintain the level of supply to the customer by, if necessary, reducing or halting (at least temporarily) power production can provide the customer with a more reliable service.

BRIEF SUMMARY OF THE INVENTION

According to a first aspect of the present invention, there is provided a method for concurrently producing power and $H_2$ from a gaseous mixture comprising $H_2$ and $CO_2$, the method comprising:

feeding the gaseous mixture at super-atmospheric pressure to a first pressure swing adsorption (PSA) system comprising adsorbent that selectively adsorbs $CO_2$ at said pressure, and selectively adsorbing $CO_2$ from the gaseous mixture with said adsorbent and at said pressure, thereby obtaining an $H_2$-enriched mixture at super-atmospheric pressure;

forming a fuel stream from a portion of the $H_2$-enriched mixture, combusting said fuel stream and expanding the resulting combustion effluent to generate power; and feeding another portion of the $H_2$-enriched mixture at super-atmospheric pressure to a second PSA system comprising adsorbent that selectively adsorbs $CO_2$ at said pressure, and selectively adsorbing $CO_2$ from said portion of the $H_2$-enriched mixture with said adsorbent and at said pressure, thereby obtaining an $H_2$ product.

According to a second aspect of the present invention, there is provided a method for adjustably producing either or both of power and $H_2$ from a gaseous mixture comprising $H_2$ and $CO_2$, the method comprising:

feeding the gaseous mixture at super-atmospheric pressure to a first pressure swing adsorption (PSA) system comprising adsorbent that selectively adsorbs $CO_2$ at said pressure, and selectively adsorbing $CO_2$ from the gaseous mixture with said adsorbent and at said pressure, thereby obtaining an $H_2$-enriched mixture at super-atmospheric pressure; and forming either or both of a fuel stream and a PSA feed stream from the $H_2$-enriched mixture, the fuel stream being combusted and the resulting combustion effluent expanded to generate power, and the PSA feed stream being fed at super-atmospheric pressure to a second PSA system comprising adsorbent that selectively adsorbs $CO_2$ at said pressure, $CO_2$ being selectively adsorbed from said PSA feed stream with said adsorbent and at said pressure, to thereby obtain an $H_2$ product;

wherein the division of $H_2$-enriched mixture between the fuel stream and PSA feed stream is adjustable, thereby allowing the proportion of the $H_2$-enriched mixture used to form the fuel stream to be increased by reducing the proportion used to form the PSA feed stream, and vice-versa, without halting the feed of the gaseous mixture to the first PSA system.

According to a third aspect of the present invention, there is provided an apparatus for producing power and $H_2$ from a gaseous mixture comprising $H_2$ and $CO_2$, the apparatus comprising:

a first pressure swing adsorption (PSA) system, comprising adsorbent that selectively adsorbs $CO_2$ at super-atmospheric pressure;

a conduit arrangement for feeding at super-atmospheric pressure the gaseous mixture into the first PSA system;

a gas turbine for combusting a fuel stream and expanding the resulting combustion effluent to generate power;

a second PSA system, comprising adsorbent that selectively adsorbs $CO_2$ at super-atmospheric pressure;

a conduit arrangement for withdrawing at super-atmospheric pressure an $H_2$-enriched mixture from the first PSA system, introducing a fuel stream into the gas turbine formed from a portion of said $H_2$-enriched mixture, and introducing another portion of said $H_2$-enriched mixture into the second PSA system; and a conduit arrangement for withdrawing an $H_2$ product from the second PSA system.

DETAILED DESCRIPTION OF THE INVENTION

Figure 1:
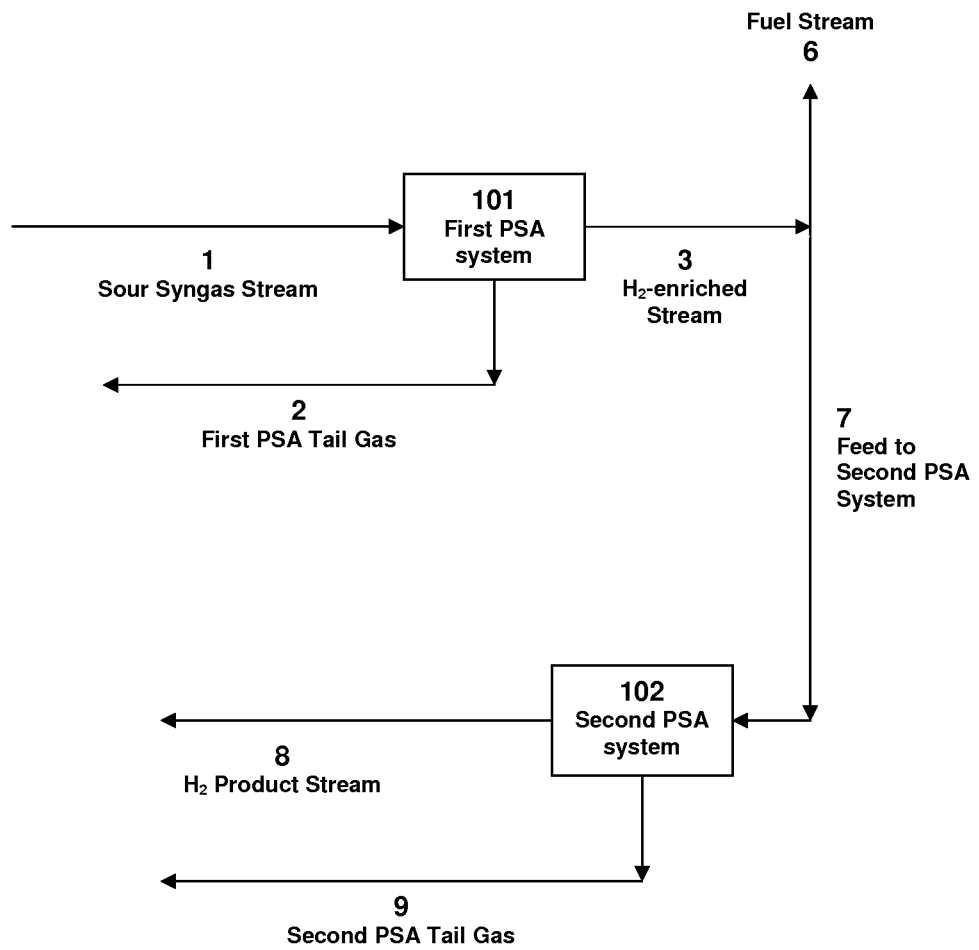
FIG. 1 is a flow sheet depicting an embodiment of the present invention.

The present invention provides in one aspect a method for concurrently producing power and $H_2$ from a gaseous mixture comprising $H_2$ and $CO_2$, the method comprising:

feeding the gaseous mixture at super-atmospheric pressure to a first pressure swing adsorption (PSA) system comprising adsorbent that selectively adsorbs $CO_2$ at said pressure, and selectively adsorbing $CO_2$ from the gaseous mixture with said adsorbent and at said pressure, thereby obtaining an $H_2$-enriched mixture at super-atmospheric pressure;

forming a fuel stream from a portion of the $H_2$-enriched mixture, combusting said fuel stream and expanding the resulting combustion effluent to generate power; and feeding another portion of the $H_2$-enriched mixture at super-atmospheric pressure to a second PSA system comprising adsorbent that selectively adsorbs $CO_2$ at said pressure, and selectively adsorbing $CO_2$ from said portion of the $H_2$-enriched mixture with said adsorbent and at said pressure, thereby obtaining an $H_2$ product.

As will be discussed in further detail, this arrangement, in which two PSA systems are used in series to separate an $H_2$ product from the gaseous mixture, with a portion of the intermediate $H_2$-enriched mixture obtained at super-atmospheric pressure from the first PSA system being used to form a fuel stream for generating power, provides an efficient means of generating both power and a high purity $H_2$ product. In particular, this arrangement provides efficiency benefits as compared to alternative arrangements that might be conceived using a single PSA system, two PSA systems in parallel, or two PSA systems in series with the fuel stream being alternatively formed.

In preferred embodiments of the invention, the division of $H_2$-enriched mixture between forming the fuel stream and being fed to the second PSA system is adjustable, thereby allowing the proportion of the $H_2$-enriched mixture used to form the fuel stream to be increased by reducing the proportion fed to the second PSA system, and vice-versa, without halting the feed of the gaseous mixture to the first PSA system. This provides further benefits in terms of providing flexibility between the levels of production of power and $H_2$ product.

The present invention also provides, in another aspect, a method for adjustably producing either or both of power and $H_2$ from a gaseous mixture comprising $H_2$ and $CO_2$, the method comprising:

feeding the gaseous mixture at super-atmospheric pressure to a first pressure swing adsorption (PSA) system comprising adsorbent that selectively adsorbs $CO_2$ at said pressure, and selectively adsorbing $CO_2$ from the gaseous mixture with said adsorbent and at said pressure, thereby obtaining an $H_2$-enriched mixture at super-atmospheric pressure; and forming either or both of a fuel stream and a PSA feed stream from the $H_2$-enriched mixture, the fuel stream being combusted and the resulting combustion effluent expanded to generate power, and the PSA feed stream being fed at super-atmospheric pressure to a second PSA system comprising adsorbent that selectively adsorbs $CO_2$ at said pressure, $CO_2$ being selectively adsorbed from said PSA feed stream with said adsorbent and at said pressure, to thereby obtain an $H_2$ product;

wherein the division of $H_2$-enriched mixture between the fuel stream and PSA feed stream is adjustable, thereby allowing the proportion of the $H_2$-enriched mixture used to form the fuel stream to be increased by reducing the proportion used to form the PSA feed stream, and vice-versa, without halting the feed of the gaseous mixture to the first PSA system.

Accordingly, in this method both power and an $H_2$ product can, again, be simultaneously produced by separating the starting gaseous mixture, comprising $H_2$ and $CO_2$, using two PSA systems in series, thereby providing the aforementioned benefits in terms of process efficiency. However, in this method the division of $H_2$-enriched mixture between the fuel stream and PSA feed stream is fully adjustable, without halting the feed of the gaseous mixture to the first PSA system, such that at any one point in time the method may be operated so as to generate solely power or generate solely $H_2$ product. This, of course, maximizes the flexibility of the process.

In the methods according to the present invention, the gaseous mixture fed to the first PSA system comprises, as noted above, $H_2$ and $CO_2$. Preferably $H_2$ and $CO_2$ constitute the major components of the mixture (i.e. the mole % of each of these components individually is greater than that of any other individual component present in the mixture). Preferably, the mixture comprises: about 20 to 90% mole %, more preferably about 30 to 75 mole %, $H_2$; and about 10 to 60% mole % $CO_2$.

The gaseous mixture may comprise other components in addition to $H_2$ and $CO_2$. For example, the gaseous mixture may further comprise: other carbonaceous components, such as CO, $CH_4$, and/or longer chain hydrocarbons; sulphurous components, such as $H_2S$, COS and/or other sulphides (of which $H_2S$ will typically be the major component, i.e. present in a mole % that is greater than that of any other individual sulphurous component); one or more inert gases, such as $N_2$ and/or Ar; and/or water. In preferred embodiments the mixture further comprises $H_2S$. Where $H_2S$ is present, this is preferably present in an amount of up to about 4 mole %, more preferably up to about 2 mole %. Where CO is present, it is preferably present in an amount of no more than 10 mole %. Where $CH_4$ is present, it is preferably present in an amount of no more than 10 mole %.

Preferably, the gaseous mixture is obtained from gasification of or reforming carbonaceous feedstock. The carbonaceous feedstock may, for example, be a carbon-rich (e.g. coal) or hydrocarbon (e.g. natural gas) feedstock. If there is sulphur in the feedstock (such as where the feedstock is coal or petcoke) then this will typically result in the presence of one or more of the aforementioned sulphurous components in the gaseous mixture. Any inert gases such as $N_2$ and Ar present in the gaseous mixture would typically come from the fuel or the oxidant (e.g. about 95% purity $O_2$ from an air separation unit) used for gasification/reforming. The gaseous mixture obtained from gasification/reforming may also have been subjected to one or more water-gas-shift reaction steps, whereby at least some of the CO present in the initial effluent from the gasifier/reformer has been converted by reaction with $H_2O$ to obtain further $H_2$ and $CO_2$. Water may thus be present in the gaseous mixture as a result of the initial gasification/reforming process, as a result of subsequent shift reaction steps, and/or as a result of other forms of processing of the initial effluent from the gasifier/reformer (for example from a quenching step carried out on the gasifier effluent to remove ash and other particulates).

The super-atmospheric pressure at which the gaseous mixture is fed to the first PSA system is preferably in the range of about 1-10 MPa (10-100 bar) absolute, and more preferably in the range of about 2-7 MPa (20-70 bar) absolute. The temperature of the feed will normally be in the range of about 10-60° C., such as at about ambient temperature. However, where the first PSA system is to effect a sorption-enhanced water-gas-shift (SEWGS) reaction then higher feed temperatures, such as in the range of about 200-500° C., would typically be required.

Where the gaseous mixture is obtained from gasification of or reforming carbonaceous feedstock, the gasification or reforming process (and any subsequent processing of the gasifier or reformer effluent) is therefore preferably carried out under conditions such that the gaseous mixture is obtained at pressures and temperatures as indicated above. For example, methods of operating a gasifier such that the gasifier effluent is obtained at super-atmospheric pressures are known in the art. However, additional compression, heating and/or cooling steps may also be employed, as and if required.

The $H_2$-enriched mixture, obtained from the first PSA system, is enriched in $H_2$ and depleted in $CO_2$ relative to the gaseous mixture (i.e. the mole % of $H_2$ and the mole % $CO_2$ in the $H_2$-enriched mixture are greater and lesser, respectively, than those of the gaseous mixture), although some $CO_2$ will still be present (complete removal of $CO_2$ being unnecessary and uneconomic for the use of a portion of the $H_2$-enriched mixture as fuel for generating power). Where the gaseous mixture also contains more one or more other carbonaceous components, the $H_2$-enriched mixture may also be depleted in one or more, or indeed all, of said carbonaceous components (i.e. the mole % of each of said components in the $H_2$-enriched mixture is less than that in the gaseous mixture). Where the gaseous mixture also contains $H_2S$, the $H_2$-enriched mixture is, preferably, depleted in $H_2S$ relative to the gaseous mixture (i.e. the mole % of $H_2S$ in the $H_2$-enriched mixture is less than that in the gaseous mixture). Where the gaseous mixture also contains one or more other sulphurous components, the $H_2$-enriched mixture is, preferably, also depleted in said sulphurous components (i.e. the mole % of each of said components in the $H_2$-enriched mixture is less than that in the gaseous mixture).

As noted above, at least a portion of the $H_2$-enriched mixture from the first PSA is or can be used to form a fuel stream, said fuel stream being combusted and the resulting combustion effluent expanded to generate power. Preferably, said combustion and expansion is carried out in a gas turbine. It is therefore preferred that the $H_2$-enriched mixture is sufficiently deplete in carbonaceous and sulphurous components to allow the mixture to be used for forming fuel to a gas turbine (or other system operated to combust the mixture and expand the resulting combustion effluent) without requiring any further purification.

The acceptable levels of sulphurous components in the fuel stream will depend on the allowable emission limits for $SO_x$ ($SO_2$ and $SO_3$), which will be the final disposition of the sulphur after combustion. By way of example, United States Department of Energy report DOE/NETL-2007/1281, Cost and Performance Baseline for Fossil Energy Plants: Volume 1: Bituminous Coal and Natural Gas to Electricity, the disclosure of which is incorporated herein by reference, gives examples of $SO_x$ emission allowances for an integrated gasification combined cycle (IGCC) plant (see page 35 of the report).

Likewise, any carbonaceous components other than $CO_2$ in the fuel stream to the gas turbine (or other combustion system) will be oxidized to $CO_2$, and along with $CO_2$ in the fuel stream will count towards the $CO_2$ emissions from the plant, on which there will typically also be constraints. Depending upon the regulations applicable, this could be a fixed limit on the amount of $CO_2$ per unit of power produced, or the $CO_2$ emissions could have an assigned monetary value (e.g. carbon tax, cap & trade) in which case the amount of $CO_2$ and other carbonaceous components in the fuel will be restricted to levels at which the power production process remains economically viable.

Preferably, the first PSA system: adsorbs at least about 70%, more preferably at least about 80% and most preferably at least about 90% of the $CO_2$ present in the gaseous mixture; and/or adsorbs at least about 70%, more preferably at least about 80% and most preferably at least about 90% of the carbonaceous components (in total) present in the gaseous mixture. Consequently, the $CO_2$ recovery in the $H_2$-enriched mixture (i.e. the percentage of the $CO_2$ present in the gaseous mixture that is recovered in the $H_2$-enriched mixture) is preferably at most about 30%, more preferably at most about 20%, and most preferably at most about 10%; and/or the total carbonaceous component recovery in the $H_2$-enriched mixture (i.e. the percentage of the carbonaceous components in total present in the gaseous mixture that is recovered in the $H_2$-enriched mixture) is preferably at most about 30%, more preferably at most about 20%, and most preferably at most about 10%. Preferably, the $H_2$ recovery in the $H_2$-enriched mixture (i.e. the percentage of the $H_2$ present in the gaseous mixture that is recovered in the $H_2$-enriched mixture) is at least about 70%, more preferably at least about 80% and most preferably at least about 90%. Typically, the first PSA system adsorbs at most about 99% of the $CO_2$ present in the gaseous mixture, and thus the $CO_2$ recovery in the $H_2$-enriched mixture is typically at least 1%.

The above percentages can be calculated from the relative molar contents of $CO_2$, carbonaceous components (in total), or $H_2$ of the gaseous and $H_2$-enriched mixtures. Thus, if for example the feed of gaseous mixture to the first PSA system were to comprise 90 kmol/hr of $CO_2$, 100 kmol/hr of all carbonaceous components (including $CO_2$) in total, and 100 kmol/hr of $H_2$; and the $H_2$-enriched mixture obtained from the first PSA system were to contain 9 kmol/hr of $CO_2$, 10 kmol/hr of all carbonaceous components in total, and 90 kmol/hr of $H_2$; then in this case 90% of the $CO_2$, 90% of the carbonaceous components in total and 10% of the $H_2$ would be adsorbed by the first PSA system, and 10% of the $CO_2$, 10% of the carbonaceous components (in total) and 90% of the $H_2$ would be recovered in the $H_2$-enriched mixture.

Where the gaseous mixture also contains $H_2S$ and/or other sulphurous components, the first PSA system, preferably, also adsorbs at least about 95%, more preferably at least about 99% and most preferably at least about 99.9% of the of the total moles of sulphur in the feed. Consequently, the recovery of sulphurous components in the $H_2$-enriched mixture, in terms of the total moles of sulphur in the $H_2$-enriched mixture as compared to in the gaseous mixture, is preferably at most about 5%, more preferably at most about 1%, and most preferably at most about 0.1%.

Preferably, the $H_2$-enriched mixture comprises greater than about 90 mole % $H_2$. Where the gaseous mixture contains $H_2S$, the $H_2$-enriched mixture comprises preferably less than about 50 ppm, more preferably less than about 20 ppm, and most preferably less than about 5 ppm $H_2S$.

Where water is also present in the gaseous mixture, the $H_2$-enriched mixture is preferably depleted in water relative to the gaseous mixture. Preferably, the $H_2$-enriched mixture is substantially or entirely free of water. This has the advantage of allowing use of adsorbents in the second PSA system that are intolerant to water or perform better in a "dry" environment.

Where the gaseous mixture contains inert gases, such as $N_2$ and Ar, the $H_2$-enriched mixture will typically be enriched in these gases alongside $H_2$.

The super-atmospheric pressure at which the $H_2$-enriched mixture is obtained is preferably the same or substantially the same as the super-atmospheric pressure at which the gaseous mixture is fed to the first PSA system. As will be explained in further detail below, the $H_2$-enriched mixture is formed at least in part, and preferably entirely, from gas pushed through the bed(s) of the first PSA system at the super-atmospheric pressure at which the gaseous mixture is fed to the first PSA system. In certain circumstances, some drop in pressure as the gas is pushed through the bed(s) of the PSA system may be unavoidable, in which case the pressure at which the gas is obtained will, self-evidently, be somewhat lower than that at which the gas is fed to the first PSA system. However, preferably any such pressure drop is minimized or avoided. Where such a pressure drop does occur, the pressure drop is preferably at most 0.1 MPa (1 bar). Preferably, the first PSA system is operated such that the pressure at which the $H_2$-enriched mixture is obtained is the same as or in excess of the pressure required for being fed to the second PSA system or for forming the fuel stream that is to be combusted in a gas turbine (or other system for combusting the fuel stream and expanding the resulting combustion effluent to generate power). Where the pressures required for being fed to the second PSA system and for forming the fuel stream differ (as may often be the case), the first PSA system may, in particular, be operated such that the pressure at which the $H_2$-enriched mixture is obtained is the same as the higher or lower of these two pressures, or in between the two.

As noted above, at least a portion of the $H_2$-enriched mixture is or can be fed to the second PSA system. The $H_2$-enriched mixture withdrawn from the first PSA system for feeding to the second PSA system may be fed directly to the second PSA system as it is withdrawn, or it may be sent to an intermediate buffer/storage tank and supplied from there to the second PSA system. The use of a buffer/storage tank is, in particular, preferred in methods where the division of the $H_2$-enriched mixture between forming the fuel stream and being fed to the second PSA system may be varied, as the use of a buffer/storage tank can mitigate the effects of such variations on the supply of $H_2$-enriched mixture to the second PSA system.

The $H_2$-enriched mixture may, as noted above, be obtained at a pressure that is suitable for being fed to the second PSA system. However, where this is not the case, the pressure of the $H_2$-enriched mixture to be fed to the second PSA system may be increased or decreased as necessary, for example using one or more compressors or expanders.

The $H_2$-enriched mixture may be fed to the second PSA system at the temperature at which it is obtained from the first PSA system. More preferably, however, the $H_2$-enriched mixture fed to the second PSA system is cooled prior to being introduced into the second PSA system. This will typically enhance the performance of the second PSA system, as a lower feed temperature generally results in higher adsorbent capacities. The feed to the second PSA system may be cooled via indirect heat exchange in one or more heat exchangers (using, for example, water and/or a tail gas from the second PSA system as coolants).

As noted above, at least a portion of the $H_2$-enriched mixture from the first PSA is or can be used to form a fuel stream which is combusted and the resulting combustion effluent expanded, preferably in a gas turbine, to generate power. The formation of this fuel stream (in its entirety or at least in part) from a gas which is already at super-atmospheric pressure reduces the amount of compression of the fuel stream needed prior to combustion and expansion, thereby increasing the efficiency with which power is produced. As noted above, the $H_2$-enriched mixture may be obtained at a super-atmospheric pressure suitable for combustion in the gas turbine (or other system used to combust the fuel stream and expand the resulting combustion effluent to generate power) without any further compression. In such circumstances, and depending on the pressures of any other gases (if any) combined with the $H_2$-enriched mixture to form the fuel stream, the need for any further compression of the fuel stream prior to combustion and expansion may be avoided altogether.

The fuel stream may be formed solely from the $H_2$-enriched mixture. Preferably, however, the portion of the ft-enriched mixture for forming the fuel stream is combined with a suitable diluent, such as $N_2$ and/or steam, so as to reduce $NO_x$ formation. The fuel stream may be heated or cooled as required to an acceptable inlet temperature to maximise power production (e.g. about 100-400° C.).

As noted above, in preferred embodiments the fuel stream is combusted and the resulting combustion effluent expanded in a gas turbine. As is known in the art, a gas turbine comprises a combustion chamber in fluid flow connection with a turbine. The fuel stream to the gas turbine is mixed with a oxidant stream (e.g. air) and combusted in the combustion chamber to produce a heated combustion effluent at super-atmospheric pressure, and energy is then extracted from the combustion effluent by passing the effluent through the turbine to generate power and an expanded combustion effluent. The gas turbine typically further comprises a compressor for compressing the air (or other oxidant stream) prior to said stream entering the combustion chamber, said compressor typically being driven by the turbine (in addition to the turbine generating electrical power and/or power for other uses), for example by being connected directly to the turbine via a common drive shaft.

The $H_2$ product, obtained from the second PSA system, is enriched in $H_2$ relative to the $H_2$-enriched mixture, and thus further enriched in $H_2$ relative to the gaseous mixture; and is depleted in $CO_2$ relative to the $H_2$-enriched mixture, and thus further depleted in $CO_2$ relative to the gaseous mixture. The $H_2$ product is, preferably, also depleted in any and all components other than $H_2$ that are present in the $H_2$-enriched mixture, such as any and all residual carbonaceous components (additional to $CO_2$), any residual sulphurous components, any remaining water, and any inert components (e.g. Ar and $N_2$). Preferably, the purity of the $H_2$ product is such that it is suitable for use in refinery, chemical or fuel cell applications. Preferably, the $H_2$ product is essentially pure $H_2$. For example, the $H_2$ product preferably comprises at least about 99.9 mole % $H_2$, more preferably at least about 99.99 mole % $H_2$. Most preferably the $H_2$ product comprises at least about 99.9999 mole % $H_2$ (i.e. wherein the combined amounts of any other components still present in the product total about 1 ppm or less).

$H_2$ product may, for example, be withdrawn and sent directly to one or more downstream processes or for supply to a customer, or may be sent to storage. The ability to store the $H_2$ product is, in particular, beneficial where the division of $H_2$-enriched mixture between forming the fuel stream and being fed to the second PSA system is adjustable, as the use of storage may, in this case, mitigate the impact of variations in feed to the second PSA system. The use of storage may, for example, be desirable or even necessary where the $H_2$ product is for supply to a customer that requires a constant flow rate of high purity $H_2$ (and in which case the storage should be appropriately sized to manage the expected variations in feed rate). The $H_2$ product may, for example, be stored as a gas or liquid in a tank, underground, or in the pipeline system (by allowing the pipeline pressure to vary).

Each of the first and second PSA systems comprises one or more beds of adsorbent, as is known in the art. For example, each system may comprise a plurality of beds, with the PSA cycles of the individual beds being appropriately staggered so that, at any point in time, there is always at least one bed undergoing adsorption and at least one bed undergoing regeneration, such that the system can continuously separate the stream fed to it. The system may also, for example, comprise more than one bed arranged in series, with the beds in series undergoing adsorption at the same time, the gas passing through one bed being passed to the next bed in the series, and with gases desorbed from the beds during regeneration being appropriately combined.

Each PSA system may comprise a single type of adsorbent, selective for all the components that are to be selectively adsorbed by said system, or more than one type of adsorbent which adsorbents in combination provide the desired selective adsorption. Where more than one type of adsorbent is present, these may be intermixed and/or arranged in separate layers/zones of a bed, or present in separate beds arranged in series, or arranged in any other manner as appropriate and known in the art.

The first PSA system is used, as noted above, to separate the $H_2$-enriched mixture from the gaseous mixture, and therefore comprises adsorbent that selectively adsorbs $CO_2$ (i.e. that adsorbs $CO_2$ preferentially to $H_2$, or, to put it another way, that adsorbs $CO_2$ with greater affinity than $H_2$) from the gaseous mixture at the super-atmospheric pressure(s) at which the gaseous mixture is fed to the first PSA system. Where the $H_2$-enriched mixture is to be also depleted in one or more other carbonaceous components, in one or more sulphurous components and/or in water relative to the gaseous mixture then the first PSA system comprises adsorbent(s) that selectively adsorb (i.e. adsorb preferentially to $H_2$) these components at said pressure(s) also. Typically, the adsorbents used in the first PSA system are not selective for inert gases, such as $N_2$ and Ar, and if this is the case then where these gases are present in the gaseous mixture they will preferentially pass through the first PSA system alongside $H_2$.

The adsorbent or adsorbents used in the first PSA system will be chosen so as to provide the desired purity of $H_2$-enriched mixture, and suitable adsorbents are known in the art. Examples of suitable types of adsorbent for use in the first PSA system include aluminas, silica gels, activated carbons and molecular sieves. Where selective adsorption of $H_2S$ and/or other sulphurous components is not required, a preferred adsorbent may be activated carbon as this has a high affinity for $CO_2$ (and other carbonaceous components) over $H_2$. Where selective adsorption of $H_2S$ and/or other sulphurous components is required then a preferred adsorbent would be silica gel, which has affinity and stability for adsorbing both $CO_2$ and $H_2S$, or a silica gel/carbon split. A suitable type of silica gel for use as an adsorbent for $H_2S$ is, for example, the high purity silica gel (greater than 99% $SiO_2$) described in US-A1-2010/0011955, the disclosure of which is incorporated herein by reference.

If the first PSA system is to effect an SEWGS reaction (wherein the PSA system effects a water-gas-shift reaction at the same type as adsorbing both existing $CO_2$ from the gaseous mixture and $CO_2$ newly formed from the gaseous mixture by the shift reaction) then the PSA system must comprise a material that is also catalytically active in terms of the water-gas-shift reaction. A $K_2CO_3$ promoted hydrotalcite as described in EP-B1-1006079 and WO-A1-2010/059055, the disclosures of which are incorporated herein by reference, is a preferred material in this case. U.S. Pat. No. 7,354,562, the disclosure of which is incorporated herein by reference, describes an exemplary SEWGS process that could be carried out by the first PSA system.

The second PSA system is used, as noted above, to separate the $H_2$ product from the $H_2$-enriched mixture fed to said system, and therefore comprises adsorbent(s) that selectively adsorbs $CO_2$ (i.e. that adsorbs $CO_2$ preferentially to $H_2$, or, to put it another way, that adsorbs $CO_2$ with greater affinity than $H_2$), and preferably any and all components other than $H_2$ still present in the $H_2$-enriched mixture, at the super-atmospheric pressure(s) at which the $H_2$-enriched mixture is fed to the second PSA system. The adsorbent or adsorbents used in the second PSA will be chosen so as to provide the desired purity of the $H_2$ product, and again suitable types of adsorbent are known in the art. Typically, one or more layers of adsorbent will be used, selected from aluminas, silica gels, activated carbons and zeolite molecular sieves. In order to produce a high purity $H_2$ product, a silica gel/carbon/5A zeolite split may, for example, be preferred.

In circumstances where a plurality of $H_2$ products with differing grades of purity are desired, the second PSA system may also be designed to produce said plurality of $H_2$ products. In this case, the second PSA system may, for example, comprise more than one bed or sets of beds operated in parallel, which comprise different adsorbents and/or are operated under different reaction conditions, so as to produce $H_2$ products of different grades of purity.

Each of the first and second PSA systems may be operated in the same way as known PSA systems for separating $H_2$ (also referred to herein as $H_2$-PSA systems), with all known PSA cycle options (e.g. cycle and step timings; use, order and operation of adsorption, equalization, repressurisation, depressurization and purge steps; and so forth) appropriate to this technology area. Suitable operating conditions for PSA systems, in order to obtain $H_2$ purities/compositions as presently desired for the $H_2$-enriched mixture and $H_2$ product, are likewise known in the art.

The PSA cycles carried out in the first and second PSA systems will, of course, typically include at least adsorption, blowdown/depressurisation and purge steps. In the case of the first PSA system, during the adsorption step the gaseous mixture is fed at super-atmospheric pressure to the bed(s) undergoing the adsorption step and $CO_2$ (and any other components of the gaseous mixture in which the $H_2$-enriched mixture is to be depleted) are selectively adsorbed, the gas pushed through the bed(s) during this step forming all or at least a portion of the $H_2$-enriched mixture. During the blowdown/depressurisation step(s) and purge step the pressure in the bed(s) is reduced, and a purge gas passed through the bed(s), to desorb $CO_2$ and other components adsorbed during the previous adsorption step, thereby regenerating the bed(s) in preparation for the next adsorption step.

Similarly, in the case of the second PSA system, during the adsorption step $H_2$-enriched mixture is fed at super-atmospheric pressure to the bed(s) undergoing the adsorption step and $CO_2$ and, preferably, all components other than $H_2$ still present in the $H_2$-enriched mixture are selectively adsorbed, the gas pushed through the bed(s) during this step forming all or at least a portion of the $H_2$ product. During the blowdown/depressurisation step(s) and purge step the pressure in the bed(s) is reduced, and a purge gas passed through the bed(s), to desorb $CO_2$ and other components adsorbed during the previous adsorption step, thereby regenerating the bed(s) in preparation for the next adsorption step.

The preferred super-atmospheric pressures and temperatures at which the gaseous mixture and the $H_2$-enriched mixture are fed during the adsorption step are described above. The blowdown/depressurisation and purge steps used in the first and second PSA systems may, for example, be conducted down to and at, respectively, about atmospheric pressure, i.e. about 0.1 MPa (1 bar) absolute, or down to and at somewhat above atmospheric pressure, such as in the range of about 0.1 to 0.5 MPa (1 to 5 bar) absolute. Alternatively, the first and/or second PSA systems could employ a vacuum pressure swing adsorption (VPSA) cycle, in which case the bed(s) of the PSA system would be depressurized down to and purged at sub-atmospheric pressures.

Thus, in preferred embodiments, the methods of the invention further comprise: desorbing $CO_2$ from the first PSA system, at a pressure lower than said pressure at which $CO_2$ was selectively adsorbed from the gaseous mixture, to form a $CO_2$-enriched mixture; and desorbing $CO_2$ from the second PSA system at a pressure lower than said pressure at which $CO_2$ was selectively adsorbed from the $H_2$-enriched mixture, to form an $H_2$ and $CO_2$-containing mixture.

The $CO_2$-enriched mixture, also referred to herein as the first PSA tail gas, is preferably formed from the gases obtained from the first PSA system during the aforementioned blowdown/depressurisation and/or purge steps of the PSA cycle. It is therefore typically obtained at about, at somewhat above, or at below atmospheric pressure, as above described. The $CO_2$-enriched mixture is enriched in $CO_2$ relative to the gaseous mixture, but will typically contain some $H_2$. This is because although the adsorbent in the first PSA system is, as previously noted, selective for $CO_2$ (i.e. adsorbs $CO_2$ preferentially to $H_2$) at the pressure at which the gaseous mixture is fed to the first PSA system, the adsorbent typically will adsorb also some $H_2$ from the gaseous mixture. In addition, some $H_2$ typically will also be present in the voids, i.e. the space in and around the adsorbent bed(s) not taken up by adsorbent material, when generation of the $CO_2$- enriched mixture is commenced (e.g. at the start of the depressurization and/or purge step). Where the $H_2$-enriched mixture is also depleted in one or more other carbonaceous components, in $H_2S$, in one or more other sulphurous components, and/or in water, then the $CO_2$-enriched mixture may be enriched (relative to the gaseous mixture) in one, more than one, or all such components also. Preferably, the $CO_2$-enriched mixture comprises at least about 70 mole % $CO_2$, more preferably at least about 80 mole % $CO_2$. The exact composition of the $CO_2$-enriched mixture will depend on the process conditions under which it is produced, such as the pressure at which desorption is carried out and composition of any purge gas.

The $H_2$ and $CO_2$-containing mixture, also referred to herein as the second PSA tail gas, is preferably formed from the gases obtained from the second PSA system during the aforementioned blowdown/depressurisation and/or purge steps of the PSA cycle. It is therefore typically obtained at about, at somewhat above, or at below atmospheric pressure, as above described. The $H_2$ and $CO_2$-containing mixture contains also $H_2$, again due to the adsorbent in the second PSA system, although being selective for $CO_2$ (i.e. adsorbing $CO_2$ preferentially to $H_2$), adsorbing also some $H_2$ from the $H_2$-enriched mixture, and/or due to some $H_2$ being present in the voids when generation of the $H_2$ and $CO_2$-containing mixture is commenced. Indeed, although as a result of the selectivity of the adsorbent the proportion of the $CO_2$ present in the $H_2$-enriched mixture adsorbed by the second PSA system will be greater than the proportion of the $H_2$ present in the $H_2$-enriched mixture adsorbed by the second PSA system, due to the relatively high content (preferably 90 mole % or more) of $H_2$ in the $H_2$-enriched mixture the actual amount of $H_2$ adsorbed by the second PSA system may be higher than the amount of $CO_2$ adsorbed by the second PSA system. The $H_2$ and $CO_2$-containing mixture may, for example, comprise at least 40 mole % $H_2$. Where, as is preferred, the $H_2$ product is also depleted in any and all components other than $H_2$ still present in the $H_2$-enriched mixture then the $H_2$ and $CO_2$-containing mixture will typically contain these components also. The exact composition of the $CO_2$-containing mixture will depend on the process conditions under which it is produced, such the pressure at which desorption is carried out and composition of any purge gas.

The $CO_2$-enriched mixture (first PSA tail gas) and $H_2/CO_2$-containing mixture (second PSA tail gas) may be further processed and/or used in a variety of ways.

The $CO_2$ from the first PSA tail gas is preferably used for enhanced oil recovery (EOR) or geologically stored. In circumstances where the first PSA tail gas is composed of relatively high purity $CO_2$, the tail gas may be used for EOR or geologically stored without further purification. In circumstances where the first PSA tail gas contains significant amounts of $H_2$, other carbonaceous components, and/or sulphurous components (such as $H_2S$), further purification of the $CO_2$ present in the tail gas may be required.

In particular, where the first PSA tail gas contains one or more combustible components such as $H_2$, one or more combustible carbonaceous components (such as $CH_4$ or CO) and/or one or more combustible sulphurous components (such as $H_2S$), at least a portion of said tail gas may, for example, be further processed by being combusted in the presence of $O_2$ to produce a $CO_2$ product comprising combustion products of said combustible components.

The combustion product of $H_2$ will be water (which can be removed by condensation or drying), the combustion product(s) of any combustible carbonaceous components will include $CO_2$ (thus providing further $CO_2$ for EOR or storage), and a combustion product of the combustible sulphurous components will be $SO_x$. Where the combustion product(s) include $SO_x$, $SO_x$ may then removed from said combustion effluent by cooling the combustion effluent to condense out water and convert $SO_3$ to sulfuric acid, and maintaining the cooled combustion effluent at elevated pressure(s) in the presence of $O_2$, water and NO for a sufficient time to convert $SO_2$ to sulfuric acid and $NO_x$ to nitric acid. The process by which $SO_x$ is removed may, in particular, be as further described in US2007/0178035, the disclosure of which is incorporated herein by reference.

Alternatively, the first PSA tail gas may be further processed in any other manner suitable for obtaining the desired level of $CO_2$ purity. For example, $H_2S$, where present, could be removed via the known Claus process. $H_2S$ and/or other sulphurous components could alternatively or additionally be removed via further adsorptive processes (using either a disposable adsorbent, or a regenerative process such as temperature swing adsorption and/or a further PSA). $CO_2$ could be further separated from $H_2$ and other, non-acid gas components (such as other carbonaceous components such as CO and $CH_4$) via known absorptive acid gas removal processes. $CO_2$ could also be further separated from $H_2$ and/or other carbonaceous components, such as CO and/or $CH_4$, via further PSA, via membrane separation and/or via partial condensation processes.

All or a portion of the second PSA tail gas may be used to form a further fuel stream. The further fuel stream may be used for any desired process, on- or off-site. The fuel stream may, for example, be used as a fuel stream for combustion to provide heat for a reformer (such as a steam-methane reformer) or gasifier used to produce the gaseous mixture, as previously described.

All or a portion of the second PSA tail gas may be further processed in the same manner as described above for the first PSA tail gas. Thus, for example, at least a portion of the second PSA tail gas may be combusted in the presence of $O_2$ to produce a $CO_2$ product comprising combustion products of $H_2$ and any other combustible components as may be present in the second PSA tail gas (such as $CH_4$, CO and/or $H_2S$). Said combustion products can then be dealt with, if and as necessary, in the same manner as described above in relation to combustion products present in a $CO_2$ product obtained from combusting the first PSA tail gas.

Where all or a portion of both the first PSA tail gas and the second PSA tail gas are combusted in the above manner, this could be done by combining the first PSA tail gas and the second PSA tail gas (or a portion thereof), and then combusting the combined gases in the presence of $O_2$ to produce a $CO_2$ product comprising combustion products of said combustible components. In this case the first PSA tail gas and second PSA tail gas could share a surge/buffer tank assembly, which could provide for better mixing and averaging of the gas compositions and flows. Alternatively, the first PSA tail gas and second PSA tail gas (or portions thereof) could be combusted as separate streams in the same furnace, in which case the second PSA tail gas (or portion thereof) could, for example, be combusted to provide a flame for stable combustion of the combustible component(s) in the first PSA tail gas. Alternatively still, both the first PSA tail gas and the second PSA tail gas could be combusted in separate furnaces.

In any of these arrangements, the heat from combustion of the first PSA tail gas and/or second PSA tail gas could be used in a variety of ways. It could, for example, be used to raise the temperature of the fuel stream (i.e. the fuel stream formed from a portion or all of the $H_2$-enriched mixture obtained from the first PSA) prior to said fuel stream being combusted and the resulting combustion effluent expanded to generate power. Alternatively or additionally, it could be used, for example by being fed to an HRSG (heat recovery steam generator) system, to raise high pressure steam that is then fed to a steam turbine to generate further power.

All or a portion of the second PSA tail gas may be compressed and recycled to the first PSA system for further separation. This can be done to recover further $H_2$ from the second PSA tail gas, and/or to separate out further $CO_2$ and/or, if present, $H_2S$ and/or any other sulphurous components. The tail gas may be recycled in a number of ways. For example all or a portion of the second PSA tail gas may be:

a) compressed to the same super-atmospheric pressure as the gaseous mixture, and added to said mixture prior to the mixture being fed to the first PSA system for adsorption of $CO_2$ and generation of the $H_2$-enriched mixture.

b) compressed to the same super-atmospheric pressure as the gaseous mixture, and fed into the bed(s) of the first PSA system before or after the adsorption step during which the gaseous mixture is fed to the bed(s) of the first PSA system. If the mole fraction of $CO_2$ in the second PSA tail gas is greater than that in the gaseous mixture then, preferably, the tail gas is fed to the first PSA system after the adsorption step. If the mole fraction of $CO_2$ in the second PSA tail gas is less than that in the gaseous mixture then, preferably, the tail gas is fed to the first PSA system before the adsorption step. In either case, the additional gas pushed through the bed(s) of the first PSA system during the step of feeding the second PSA tail gas may form an additional portion of the $H_2$-enriched mixture. Alternatively, the gas pushed through one bed of the first PSA system during this step may be used to repressurise another bed of the first PSA system undergoing a repressurisation step.

c) compressed to an intermediate pressure between the pressure at which the second PSA tail gas is obtained and the super-atmospheric pressure at which the gaseous mixture is fed to the first PSA system, and fed into the beds of the first PSA system following a pressure equalization step between beds of the first PSA system. If the mole fraction of $CO_2$ in the second PSA tail gas is greater than that in the gaseous mixture then, preferably, the tail gas is added to a bed that decreased in pressure during the prior equalization step. If the mole fraction of $CO_2$ in the second PSA tail gas is less than that in the gaseous mixture then, preferably, the tail gas is added to a bed that increased in pressure during the prior equalization step. The product end of the bed (i.e. the opposite end of the bed from that to which the $H_2$-enriched mixture is added during the adsorption step) may be kept closed so that the pressure in the bed is increased. Alternatively, the product end of the bed may remain connected to the bed to which it was connected to in the prior equalization step, so that on addition of the tail gas the pressures in the two beds rise, but remain approximately equal to each other. Alternatively still, the product end of the bed may remain open and the gas exiting from the product end may be used to purge another bed in the first PSA system.

All or a portion of the second PSA tail gas may be used as the purge gas or as an additional purge gas for the first PSA system. This can have the effect of improving the performance of the first PSA system, by increasing the dynamic capacity of the first PSA system for $CO_2$ and other components of the gaseous mixture that are to be selectively adsorbed. This use of all or a portion of the second PSA tail gas may, in particular, be preferred where $CO_2$ and other components for which the first PSA system is selective are present in relatively low concentrations. The purge gas may be added at the product end of the bed(s) of the first PSA system, in the manner described in FR-A1-2899890, the disclosure of which is incorporated herein by reference. Alternatively, the purge gas may be supplied to an intermediate (mid-point) position inside the bed(s) of the first PSA system. Where the second PSA tail gas is used as an additional purge gas then this additional purge gas may be added before, during (as for example described in FR-A1-2899890) or after purging with a purge gas obtained, for example, from the first PSA system itself.

A portion of the second PSA tail gas may compressed to the super-atmospheric pressure at which the $H_2$-enriched mixture is fed to the second PSA system, and fed back into the second PSA system for further separation. Said portion of the tail gas may be mixed with the $H_2$-enriched mixture and introduced into the second PSA system as a combined mixture. Alternatively, said portion of the tail gas could be separately introduced into the bed(s) of the second PSA system following the adsorption step during which the $H_2$-enriched mixture is introduced, and the additional gas pushed through the bed(s) of the second PSA system during introduction of the second PSA tail gas may form an additional portion of the $H_2$ product. In either case, this will enable a greater recovery of $H_2$ from the second PSA, whilst increasing the concentration of $CO_2$ and, preferably, any and all components of the $H_2$-enriched mixture other than $H_2$ in the tail gas. The remaining portion(s) of the second PSA tail gas may be used or processed in any of the other manners described herein.

All or a portion of the second PSA tail gas may be vented or flared, which may in particular be a preferred option where the amount of inert components, such as $N_2$ or Ar, in the tail gas is relatively high. This may, for example, be done via "duct firing" in an HRSG. More specifically, all or a portion of the tail gas may be combusted, for example in air, oxygen enriched air, or high purity oxygen, and the resulting combustion effluent combined with the expanded combustion effluent gas obtained (via combustion and expansion, preferably in a gas turbine, as previous described) from the fuel stream formed from the $H_2$-enriched mixture; and the combined gases used to generate steam in an HRSG, which steam can then be expanded in a steam turbine to make power. In a combined cycle (such as in an IGCC, for example) the heat from the gas turbine flue gas is used to generate steam in a HRSG, and the steam is then supplied to a steam turbine, which expands the steam and makes power (typically electric power). By duct firing the second PSA tail gas and combining the resulting combustion effluent with the gas turbine flue gas, thereby forming a combined flue gas of increased temperature, more steam at higher temperature/pressure can be produced, resulting in more power from the steam turbine.

All or a portion of the second PSA tail gas may be compressed and added to the portion of the $H_2$-enriched mixture being used to form the fuel stream that is then (in, preferably, a gas turbine) combusted and the resulting combustion effluent expanded to generate power. If $H_2S$ and/or other sulphurous components are present in the $H_2$-enriched mixture fed to the second PSA system then the second PSA tail gas will typically be enriched in these sulphurous components relative to the $H_2$-enriched mixture. Where this is the case, further measures may be needed in order to ensure that the total sulphur content of the fuel stream is such that, when combusted, the limits on $SO_x$ emissions are not exceeded.

This may, for example, further comprise passing all or a portion of the second PSA tail gas through a sorbent system (for example a disposable unit comprising ZnO adsorbent) to reduce or remove any sulphurous components prior to said tail gas being combined with the $H_2$-enriched mixture for forming the fuel stream.

Alternatively, the first PSA system may be operated in such a manner that the $H_2$-enriched mixture obtained therefrom contains a lesser concentration of sulphurous components than would otherwise be necessary if said mixture were to be combusted on its own. More specifically, the concentration of sulphurous components in the $H_2$-enriched mixture are in this case sufficiently low that after said mixture has been combined with the second PSA tail gas the resulting fuel stream formed therefrom still has a concentration of sulphurous components that is adequate to meet $SO_x$ requirements when combusted.

In those embodiments where the division of the $H_2$-enriched mixture between forming the fuel stream and being fed to the second PSA system is adjustable, and (when part of the $H_2$-enriched mixture is being fed to the second PSA system) all or a portion of the second PSA tail gas is compressed and added to the portion of the $H_2$-enriched mixture being used to form the fuel stream, additional measures may likewise be required to control the composition of the fuel stream when the division of the $H_2$-enriched mixture is adjusted. For example:

a) The first PSA system may be continuously operated such that the content of sulphurous components in the $H_2$-enriched mixture is sufficiently low that, whatever the amount (within normal operating parameters) of second PSA tail gas added to the $H_2$-enriched mixture for forming the fuel stream, combustion of the fuel stream does not lead to $SO_x$ emission limits being exceeded.

b) The first PSA system may be operated such that, as the division of the $H_2$-enriched mixture is altered to increase the amount of said mixture fed to the second PSA system (thus increasing the amount of second PSA tail gas produced and incorporated into the fuel stream), the operation of the first PSA system is altered such that amount of sulphurous components in the $H_2$-enriched mixture is reduced, thereby maintaining the amount of sulphurous components in fuel stream at levels where $SO_x$ emission limits are not exceeded. The operation of the first PSA system may, for example, be altered by one or more of the following: (i) reducing the PSA cycle time employed in the first PSA system (which will reduce the concentration of $H_2S$ in the $H_2$-enriched stream, albeit at the cost of reducing also the recovery of $H_2$); (ii) reducing the flow rate of gaseous mixture into the first PSA system (in order to reduce the loading of $H_2S$ in each PSA cycle, thereby again reducing the concentration of $H_2S$ in the $H_2$-enriched stream); (iii) increasing the amount of purge gas used to purge the first PSA system (again, this may reduce the concentration of $H_2S$ in the $H_2$-enriched stream, albeit at the cost of reducing also the recovery of $H_2$); (iv) using part of the tail gas from the second PSA as an additional purge gas for purging the first PSA system (which may increase the $H_2S$ capacity of the first PSA system, thereby again reducing the concentration of $H_2S$ in the $H_2$-enriched stream).

c) In the event that the adjustment of the division of the $H_2$-enriched mixture results in the $CO_2$ content of the fuel stream changing, the amount of any $N_2$ added to form the fuel stream may be altered to maintain the same gas turbine (or other combustion system) performance (in particular, as regards flame temperature).

d) If the operation of the first PSA system is altered (as discussed under option (b) above) in response to adjustment of the division of the $H_2$-enriched mixture then as the content of sulphurous component in the $H_2$-enriched mixture decreases so may the $CO_2$ content. If the first PSA tail gas is treated to purify the $CO_2$ contained therein then a portion of this purified $CO_2$ may added to the $H_2$-enriched mixture for forming the fuel stream, in place of or in addition to adding $N_2$ (as discussed under option (c) above).

In addition to any of the above described uses, the second PSA tail gas temperature may be increased (for example prior to being otherwise used in any of the manners described above) by being used as a coolant in one or more heat exchangers used (as previously described) to reduce via indirect heat exchange the temperature of the $H_2$-enriched mixture being fed gas to the second PSA system.

The second PSA tail gas may be fed directly for use in any of the above described processes, or may be collected in a surge/buffer tank (for example to allow a constant stream of gas to be removed from the tank in order to mitigate variations in flow and pressure from the second PSA system).

The present invention provides, in another aspect, an apparatus for carrying out the methods of the present invention. More particularly, an apparatus is provided for producing power and $H_2$ from a gaseous mixture comprising $H_2$ and $CO_2$, the apparatus comprising:

a first pressure swing adsorption (PSA) system, comprising adsorbent that selectively adsorbs $CO_2$ at super-atmospheric pressure;

a conduit arrangement for feeding at super-atmospheric pressure the gaseous mixture into the first PSA system;

a gas turbine for combusting a fuel stream and expanding the resulting combustion effluent to generate power;

a second PSA system, comprising adsorbent that selectively adsorbs $CO_2$ at super-atmospheric pressure;

a conduit arrangement for withdrawing at super-atmospheric pressure an $H_2$-enriched mixture from the first PSA system, introducing a fuel stream into the gas turbine formed from a portion of said $H_2$-enriched mixture, and introducing another portion of said $H_2$-enriched mixture into the second PSA system; and a conduit arrangement for withdrawing an $H_2$ product from the second PSA system.

In preferred embodiments, said conduit arrangement for withdrawing from the first PSA system the $H_2$-enriched mixture, introducing into the gas turbine a fuel stream formed from a portion thereof, and introducing another portion thereof into the second PSA system, includes a valve system for adjustably controlling the division of the $H_2$ enriched stream between the gas turbine and second PSA system.

In preferred embodiments, said valve system is adjustable between a setting whereby all the $H_2$ enriched mixture is sent to the gas turbine and a setting whereby all the $H_2$ enriched mixture is sent to the second PSA system.

Further preferred embodiments of the apparatus will be apparent from the above description of embodiments of the methods of the present invention. For example, the apparatus may further comprise one or more heat exchangers for cooling via indirect heat exchange (using, for example, water or second PSA tail gas as coolant) the portion of $H_2$-enriched mixture to be introduced into the second PSA system. The conduit arrangement for withdrawing $H_2$-enriched mixture and/or the conduit arrangement for withdrawing $H_2$ product may further comprise one or more buffer/storage tanks for storing the $H_2$-enriched mixture and/or $H_2$ product in the manners discussed above. The apparatus may further comprise suitable conduit arrangements and systems for withdrawing and further processing/using first and second PSA tail gases, again in any/all of the manners discussed above.

As noted above, the methods and apparatus of the present invention, in which two PSA systems are used in series to separate an $H_2$ product from the gaseous mixture, with a portion of the intermediate $H_2$-enriched mixture obtained at super-atmospheric pressure from the first PSA system being used to form a fuel stream for generating power, and in which the division of the $H_2$-enriched mixture between being used to form a fuel stream and being further separated in the second PSA system is, preferably, adjustable, provide benefits in terms of the efficiency and flexibility with which both power and a high purity $H_2$ product can be generated. In particular, these methods/apparatus provide efficiency benefits as compared to alternative arrangements that might be conceived using a single PSA system, two PSA systems in parallel, or two PSA systems in series with the fuel stream being alternatively formed.

More specifically, in the methods and apparatus according to the present invention only the first PSA system need be designed for bulk removal of $CO_2$, any other carbonaceous, and/or any sulphurous components as may be present in the gaseous mixture. This system can also be run at full capacity all the time to produce an $H_2$-enriched mixture of adequate (but not unnecessarily excessive) purity of $H_2$ for combustion and expansion to generate power, the availability of this mixture at already super-atmospheric pressure moreover reducing compression requirements for the gas turbine (or other system in which the mixture is to be combusted and resulting combustion effluent expanded). The second PSA system need then only further purify that portion of the $H_2$-enriched mixture from which the desired higher purity $H_2$ product is to be produced.

Moreover, in circumstances where it is desired to alter (for whatever reason) the ratio of power to $H_2$ product production, this can be simply achieved by adjusting the division of the $H_2$-enriched mixture between the gas turbine (or other power production system) and the second PSA system. The second PSA system can thus be switched on and off, or ramped up and down, and the gas-turbine(s) (or other power production system) correspondingly switched off and on, or ramped down and up, to increase $H_2$ product production in exchange for power production and vice-versa, as and when required and without (necessarily) adjusting the operation of the first PSA system. The use of the two PSA systems in series also affords opportunities for uses of the second PSA tail gas that allow further integration of operation of the two PSA systems, thereby improving overall process performance, that would not be possible using PSA systems in parallel only.

Conversely, if a single PSA system were to be used to separate the gaseous mixture to obtain a single $H_2$ product (for example in the manner described in US2007/0178035), and this product were to then be split to provide a fuel stream and a stream for refinery/chemicals/fuel cell applications, the PSA in the system would have to be designed so that the $H_2$ product meets the minimum purity specifications for the refinery/chemicals/fuel cell applications, and as a result the purity of the fuel stream would likely be higher than necessary. Making higher purity $H_2$ needs more adsorbent, which results in larger vessel sizes and higher capital costs, and the adsorbent must also be purged more to remove impurities, which means a lower $H_2$ recovery.

Likewise, if two PSA systems were to be used in parallel to separate the gaseous mixture, with one PSA system designed and operated to provide a lower purity $H_2$ stream for use as a fuel stream, and the other system designed and operated to make a higher purity $H_2$ product for refinery/chemicals/fuel cell applications, both systems would have to be designed and operated for bulk removal of $CO_2$ and any other carbonaceous or any sulphurous components to be removed from the gaseous mixture, which would again add to capital costs. The process would also be of more limited flexibility as regards being able to adapt to changes in demand for production of power versus high purity $H_2$ product. For instance, if it would be desired for the plant to be able to vary production between 100% power production and 50%/50% power and high purity $H_2$ product then with two parallel PSA systems the system that produces an $H_2$ product for use as fuel will need to be sized for the amount of feed it is to receive when the plant is to be operated for 100% power production. However, this PSA system will then only see half of that feed when the plant is operated for 50%150% power and high purity $H_2$ product production, vastly under-utilizing the available adsorbent.

Finally, if (adopting an arrangement similar to that described in, for example, U.S. Pat. No. 4,171,206) two PSA systems were to be used in series, but all the $H_2$-enriched mixture obtained from the first PSA system fed to the second PSA system for further separation into a $H_2$ product of suitable purity for, for example, refinery/chemicals/fuel cell applications, then either a portion of this high purity $H_2$ product would have to be used for forming a fuel stream for generating power, or a portion or all of the second PSA tail gas might have to be used to form a fuel stream. Use of a portion of the high purity $H_2$ product as a fuel stream is (as noted above in connection with the problems associated with using a singe PSA system) likely to be inefficient due to such a product being of unnecessarily high $H_2$ purity for a fuel stream. Equally, use of the second PSA tail gas is unlikely to be optimal, as although this may contain significant amounts of $H_2$ and thus have good fuel value, the gas will nevertheless inherently contain increased concentrations of carbonaceous components and (where present in the $H_2$-enriched mixture) sulphurous components compared to those present in the $H_2$-enriched mixture. Moreover, the tail gas will be at significantly lower pressure than the $H_2$-enriched mixture. Thus, use of the second PSA tail gas is likely to entail additional purification and compression requirements, which will again add to operating costs.

Aspects of the invention include:

1. A method for concurrently producing power and $H_2$ from a gaseous mixture comprising $H_2$ and $CO_2$, the method comprising:

feeding the gaseous mixture at super-atmospheric pressure to a first pressure swing adsorption (PSA) system comprising adsorbent that selectively adsorbs $CO_2$ at said pressure, and selectively adsorbing $CO_2$ from the gaseous mixture with said adsorbent and at said pressure, thereby obtaining an $H_2$-enriched mixture at super-atmospheric pressure;

forming a fuel stream from a portion of the $H_2$-enriched mixture, combusting said fuel stream and expanding the resulting combustion effluent to generate power; and feeding another portion of the $H_2$-enriched mixture at super-atmospheric pressure to a second PSA system comprising adsorbent that selectively adsorbs $CO_2$ at said pressure, and selectively adsorbing $CO_2$ from said portion of the $H_2$-enriched mixture with said adsorbent and at said pressure, thereby obtaining an $H_2$ product.

2. A method according to #1, wherein the division of $H_2$-enriched mixture between forming the fuel stream and being fed to the second PSA system is adjustable, thereby allowing the proportion of the $H_2$-enriched mixture used to form the fuel stream to be increased by reducing the proportion fed to the second PSA system, and vice-versa, without halting the feed of the gaseous mixture to the first PSA system.

3. A method for adjustably producing either or both of power and $H_2$ from a gaseous mixture comprising $H_2$ and $CO_2$, the method comprising:

feeding the gaseous mixture at super-atmospheric pressure to a first pressure swing adsorption (PSA) system comprising adsorbent that selectively adsorbs $CO_2$ at said pressure, and selectively adsorbing $CO_2$ from the gaseous mixture with said adsorbent and at said pressure, thereby obtaining an $H_2$-enriched mixture at super-atmospheric pressure; and forming either or both of a fuel stream and a PSA feed stream from the $H_2$-enriched mixture, the fuel stream being combusted and the resulting combustion effluent expanded to generate power, and the PSA feed stream being fed at super-atmospheric pressure to a second PSA system comprising adsorbent that selectively adsorbs $CO_2$ at said pressure, $CO_2$ being selectively adsorbed from said PSA feed stream with said adsorbent and at said pressure, to thereby obtain an $H_2$ product;

wherein the division of $H_2$-enriched mixture between the fuel stream and PSA feed stream is adjustable, thereby allowing the proportion of the $H_2$-enriched mixture used to form the fuel stream to be increased by reducing the proportion used to form the PSA feed stream, and vice-versa, without halting the feed of the gaseous mixture to the first PSA system.

4. A method according to any of #1 to #3, wherein the gaseous mixture further comprises $H_2S$, and the first PSA system comprises adsorbent that selectively adsorbs $CO_2$ and $H_2S$ at the super-atmospheric pressure at which the gaseous mixture is fed to the first PSA system, $CO_2$ and $H_2S$ being selectively adsorbed from the gaseous mixture with said adsorbent and at said pressure to thereby obtain the $H_2$-enriched mixture.

5. A method according to any of #1 to #4, wherein the gaseous mixture comprises: about 30 to 75% mole % $H_2$; about 10 to 60% mole % $CO_2$; and about 0 to 2 mole % $H_2S$.

6. A method according to any of #1 to #5, wherein the gaseous mixture is fed to the first PSA system at a pressure in the range of about 2-7 MPa (20-70 bar) absolute.

7. A method according to any of #1 to #6, wherein the $CO_2$ recovery in the $H_2$-enriched mixture is at most about 30%, and the $H_2$ recovery in the $H_2$-enriched mixture is at least about 70%.

8. A method according to any of #1 to #7, wherein the $H_2$-enriched mixture comprises greater than about 90 mole % $H_2$.

9. A method according to any of #1 to #8, wherein the $H_2$-enriched mixture is obtained at a pressure which is the same or substantially the same as the super-atmospheric pressure at which the gaseous mixture is fed to the first PSA system.

10. A method according to any of #1 to #9, wherein the $H_2$-enriched mixture fed to the second PSA system is cooled prior to being introduced into the second PSA system.

11. A method according to any of #1 to #10, wherein the fuel stream is combusted and combustion effluent expanded in a gas turbine.

12. A method according to any of #1 to #11, wherein the $H_2$-enriched mixture is combined with $N_2$ and/or steam to form the fuel stream.

13. A method according to any of #1 to #12, wherein the $H_2$ product comprises at least about 99.9 mole % $H_2$.

14. A method according to any of #1 to #13, wherein the method further comprises:

desorbing $CO_2$ from the first PSA system, at a pressure lower than said pressure at which $CO_2$ was selectively adsorbed from the gaseous mixture, to form a $CO_2$-enriched mixture; and desorbing $CO_2$ from the second PSA system, at a pressure lower than said pressure at which $CO_2$ was selectively adsorbed from the $H_2$-enriched mixture, to form an $H_2$ and $CO_2$-containing mixture.

15. A method according to #14, wherein the $CO_2$-enriched mixture contains one or more combustible components, and at least a portion of said mixture is combusted in the presence of $O_2$ to produce a $CO_2$ product comprising combustion products of said combustible components

16. A method according to #14 or #15, wherein at least a portion of the $H_2$ and $CO_2$-containing mixture is combusted in the presence of $O_2$ to produce a $CO_2$ product comprising combustion products of $H_2$ and any other combustible components present in said mixture.

17. A method according to #15 or #16, wherein the heat from combustion of said $CO_2$-enriched and $H_2$ and $CO_2$-containing mixtures is used to raise the temperature of the fuel stream formed from the $H_2$-enriched mixture, and/or to generate steam that is fed to a steam turbine to generate further power.

18. A method according to any of #14 to #17, wherein all or a portion of the $H_2$ and $CO_2$-containing mixture is compressed and recycled to the first PSA system for further separation.

19. A method according to any of #14 to #18, wherein all or a portion of the $H_2$ and $CO_2$-containing mixture is used as a purge gas for the first PSA system.

20. A method according to any of #14 to #19, wherein a portion of the $H_2$ and $CO_2$-containing mixture is compressed and recycled to the second PSA system for further separation.

21. A method according to any of #14 to #20, wherein all or a portion of the $H_2$ and $CO_2$-containing mixture is combusted, the resulting combustion effluent combined with the expanded combustion effluent obtained from the fuel stream formed from the $H_2$-enriched mixture, and the combined gases used to generate steam in a heat recovery steam generator.

22. A method according to any of #14 to #21, wherein all or a portion of the $H_2$ and $CO_2$-containing mixture is compressed and added to the portion of the $H_2$-enriched mixture used to form the fuel stream.

23. Apparatus for producing power and $H_2$ from a gaseous mixture comprising $H_2$ and $CO_2$, the apparatus comprising:

a first pressure swing adsorption (PSA) system, comprising adsorbent that selectively adsorbs $CO_2$ at super-atmospheric pressure;

a conduit arrangement for feeding at super-atmospheric pressure the gaseous mixture into the first PSA system;

a gas turbine for combusting a fuel stream and expanding the resulting combustion effluent to generate power;

a second PSA system, comprising adsorbent that selectively adsorbs $CO_2$ at super-atmospheric pressure;

a conduit arrangement for withdrawing at super-atmospheric pressure an $H_2$-enriched mixture from the first PSA system, introducing a fuel stream into the gas turbine formed from a portion of said $H_2$-enriched mixture, and introducing another portion of said $H_2$-enriched mixture into the second PSA system; and a conduit arrangement for withdrawing an $H_2$ product from the second PSA system.

24. An apparatus according to #23, wherein said conduit arrangement for withdrawing from the first PSA system the $H_2$-enriched mixture, introducing into the gas turbine a fuel stream formed from a portion thereof, and introducing another portion thereof into the second PSA system, includes a valve system for adjustably controlling the division of the $H_2$ enriched stream between the gas turbine and second PSA system.

25. An apparatus according to #24, wherein said valve system is adjustable between a setting whereby all the $H_2$ enriched mixture is sent to the gas turbine and a setting whereby all the $H_2$ enriched mixture is sent to the second PSA system.

Solely by way of example, certain embodiments of the invention will now be described with reference to the accompanying drawings.

Referring to FIG. 1, a first exemplary method according to the invention is depicted, in which power and a high purity $H_2$ product are concurrently produced from a gaseous mixture comprising a sour syngas. Sour syngas stream (1) obtained from a gasifier and water-gas-shift reactor (not shown) is fed at super-atmospheric pressure into a first PSA system (101) comprising adsorbent selective for $CO_2$ and $H_2S$. The sour syngas stream comprises 60% $H_2$, 38% $CO_2$, 2% $H_2S$ and trace amounts of $N_2$, Ar, $CH_4$ and CO. The first PSA system separates the sour syngas stream into an $H_2$-enriched mixture, obtained at about the same super-atmospheric pressure as the sour syngas stream and withdrawn as $H_2$-enriched stream (3), and a first PSA tail gas (2) obtained at about atmospheric pressure. The first PSA tail gas comprises 14% $H_2$, 81% $CO_2$ and 5% $H_2S$. The $H_2$-enriched stream comprises 93% $H_2$, 7% $CO_2$, 3 ppm $H_2S$ and trace amounts of $N_2$, Ar, $CH_4$ and CO, which composition renders the stream suitable for use as a gas turbine fuel.

The $H_2$-enriched stream (3) is divided into a fuel stream (6), and a feed stream (7) to a second PSA system (102) comprising adsorbent selective for $CO_2$, $H_2S$, $N_2$, Ar, $CH_4$ and CO, both streams remaining of the same composition and at the same pressure as the $H_2$-enriched stream. The fuel stream is sent to one or more gas turbines (not shown) forming part of an IGCC (not shown) where it is combusted and resulting combustion effluent expanded in order to generate electric power. The second PSA system separates the feed stream (7) of $H_2$-enriched mixture into an $H_2$ product stream (8), obtained at about the same super-atmospheric pressure as the feed stream (7), and a second PSA tail gas (9) obtained at about atmospheric pressure. The second PSA tail gas comprises 59% $H_2$, 41% $CO_2$, 19 ppm $H_2S$ and trace amounts of $N_2$, Ar, $CH_4$ and CO. The $H_2$ product stream comprises 99.99+% $H_2$, <1 ppm $CO_2$ and <1 ppb $H_2S$.

If a variety of different $H_2$ product streams were to be desired, the second PSA system (102) could also be composed of a set parallel PSA units, between which the feed stream (7) would be divided, with each PSA unit making a different purity of $H_2$ product. Depending on the quantity of feed gas to be processed, more than one PSA unit could also be required even if a single $H_2$ product is to be produced.

Figure 2A:
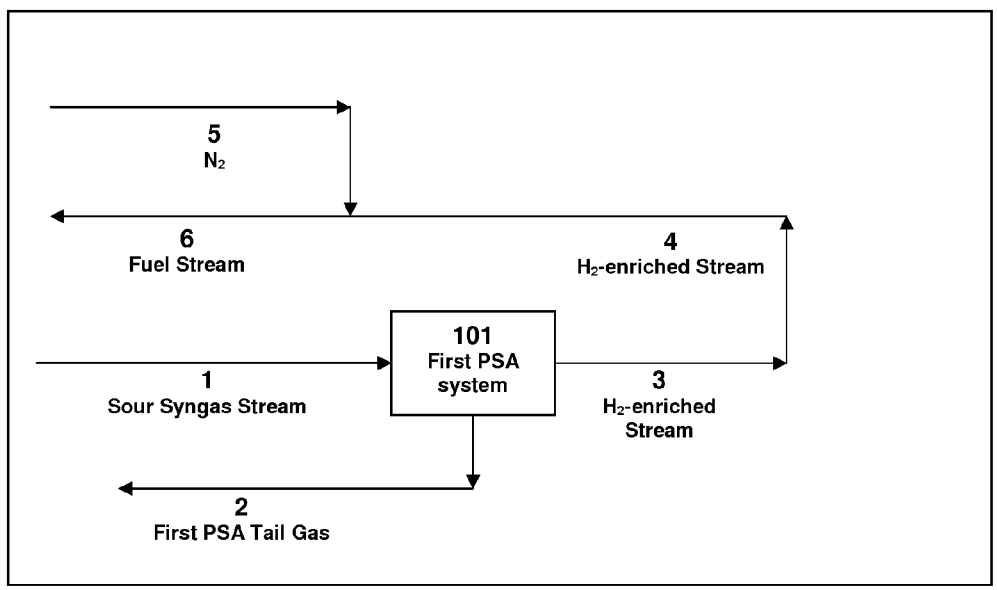
FIG. 2A is a flow sheet depicting another embodiment of the present invention in a first mode of operation.
Figure 2B:
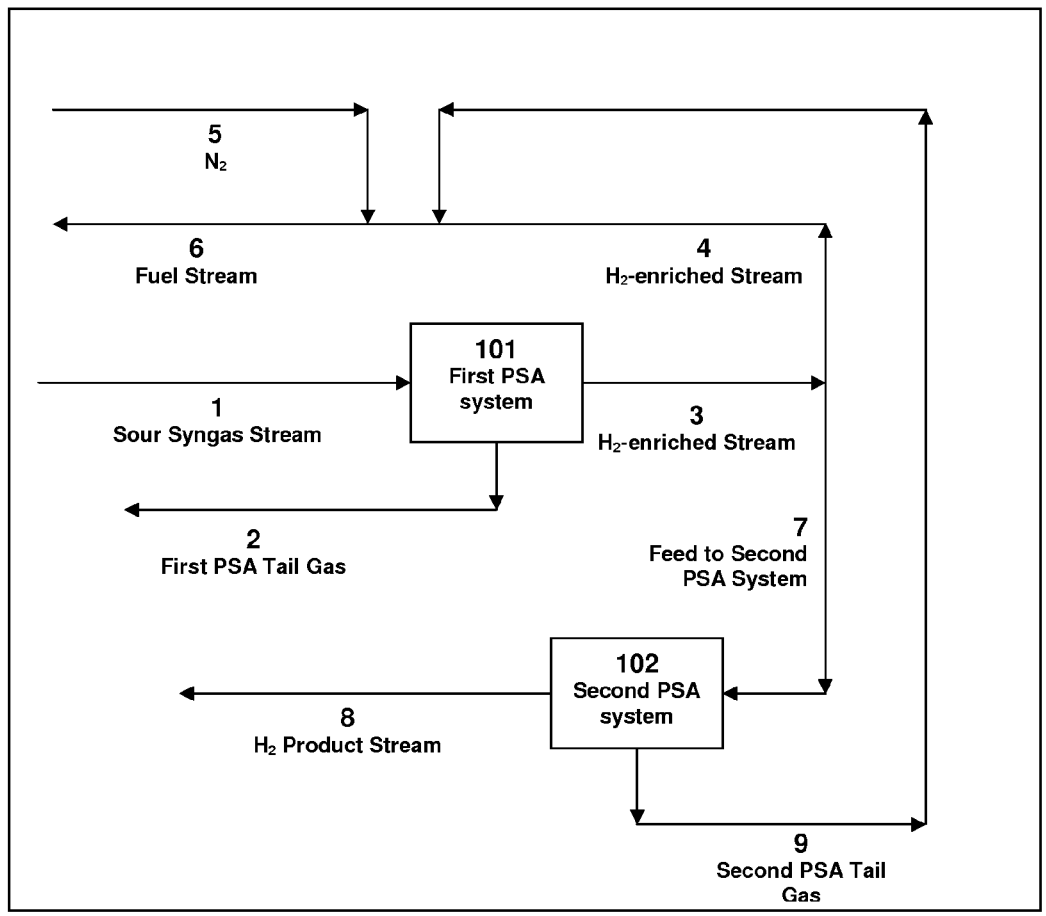
FIG. 2B is a flow sheet depicting the embodiment of FIG. 2A in a second mode of operation.

Referring to FIGS. 2A and 2B, a second exemplary method according to the invention is depicted, in which in a first mode of operation (as depicted in FIG. 2A) only power is produced from a sour sygnas, and in a second mode of operation (as depicted in FIG. 2B) both power and a high purity $H_2$ product are concurrently produced from the sour syngas. In FIGS. 2A and 2B the same reference numerals have been used as in FIG. 1 to denote common features, for the sake of brevity.

Thus, as depicted in FIG. 2A, in a first mode of operation the $H_2$-enriched stream (3, 4) separated from the sour syngas feed (1) in the first PSA system (101) is used in its entirety to form a fuel stream (6) which is sent to one or more gas turbines (not shown) forming part of an IGCC (not shown) where it is combusted and the resulting combustion effluent expanded in order to generate electric power. In this case the fuel stream (6) is formed by combining the $H_2$-enriched stream (3, 4) with a diluent stream (5) composed of high purity $N_2$.

As depicted in FIG. 2B, in the second mode the operation of the method is adjusted so as to provide both electric power and high purity $H_2$. This is done by now dividing the $H_2$-enriched stream (3) into a stream (4) for forming the fuel stream (6) and a feed stream (7) to be sent to the second PSA system (102), which second PSA system is now brought on-line to separate the feed stream (7) into the desired $H_2$ product (8) and a second PSA tail gas (9). In this mode of operation, the fuel stream (6) is then formed from combining the portion of the $H_2$-enriched stream forming stream (4) with both the diluent stream (5) composed of high purity $N_2$ and the second PSA tail gas (9).

The composition of the various streams during the first and second modes of operation are shown below in Tables 1 and 2.

As can be seen from Table 1, during the first mode of operation the first PSA system is operated to provide 90% $CO_2$ and a $H_2$ recovery of 90%. In this embodiment, 10 ppm of $H_2S$ is a permissible content of sulphurous components for the gas turbine fuel.

TABLE 1

| | | Power Production Only | | | | | |
|---|---|---|---|---|---|---|---|
| Stream | | 1 | 2 | 3 | 4 | 5 | 6 |
| $H_2$ | kmol/h | 6.00E+01 | 6.00E+00 | 5.40E+01 | 5.40E+01 | 0.00E+00 | 5.40E+01 |
| $N_2$ | kmol/h | 0.00E+00 | 0.00E+00 | 0.00E+00 | 0.00E+00 | 5.02E+01 | 5.02E+01 |
| $CO_2$ | kmol/h | 3.80E+01 | 3.42E+01 | 3.80E+00 | 3.80E+00 | 0.00E+00 | 3.80E+00 |
| $H_2S$ | kmol/h | 2.00E+00 | 2.00E+00 | 1.08E−03 | 1.08E−03 | 0.00E+00 | 1.08E−03 |
| $H_2$ | % | 60.00 | 14.22 | 93.42 | 93.42 | 0.00 | 50.00 |
| $N_2$ | % | 0.00 | 0.00 | 0.00 | 0.00 | 100.00 | 46.48 |
| $CO_2$ | % | 38.00 | 81.04 | 6.57 | 6.57 | 0.00 | 3.52 |
| $H_2S$ | ppm | 20000 | 47369 | 19 | 19 | 0 | 10 |

As can be seen from Table 2, during the second mode of operation only half the amount of power (as compared to in the first mode of operation) is to be produced, and thus the fuel stream is halved (with, for example, one of two gas turbines being switched off). The PSA cycle time of the first PSA system is also changed such that the $H_2$ recovery decreases to 85% and the $CO_2$ capture increases to 92.5%. This is in order to effect also a higher level of $H_2S$ capture by the first PSA system, as in this mode of operation the amount of $H_2S$ in the $H_2$-enriched steam (3) must decrease from 19 ppm $H_2S$ to 10 ppm in order that, after the $H_2$-enriched steam (3) has been combined with the second PSA tail gas (9) and diluent stream (5), the content of $H_2S$ in the gas turbine fuel (6) is maintained at 10 ppm $H_2S$. The second PSA has a $H_2$ recovery of 85% to produce a high purity $H_2$ with a purity of 1 ppm of $CO_2$.

TABLE 2

| | | \multicolumn{5}{c|}{Production of Power and high purity $H_2$} |
|---|---|---|---|---|---|---|
| | | 1 | 2 | 3 | 4 | 5 |
| H2 | kmol/h | 6.00E+01 | 9.00E+00 | 5.10E+01 | 2.28E+01 | 0.00E+00 |
| N2 | kmol/h | 0.00E+00 | 0.00E+00 | 0.00E+00 | 0.00E+00 | 2.42E+01 |
| CO2 | kmol/h | 3.80E+01 | 3.52E+01 | 2.85E+00 | 1.27E+00 | 0.00E+00 |
| H2S | kmol/h | 2.00E+00 | 2.00E+00 | 5.40E-04 | 2.41E-04 | 0.00E+00 |
| H2 | % | 60.00 | 19.50 | 94.71 | 94.71 | 0.00 |
| N2 | % | 0.00 | 0.00 | 0.00 | 0.00 | 100.00 |
| CO2 | % | 38.00 | 76.17 | 5.29 | 5.29 | 0.00 |
| H2S | ppm | 20000 | 43326 | 10 | 10 | 0 |
| | | 6 | 7 | 8 | 9 | |
| H2 | kmol/h | 2.70E+01 | 2.82E+01 | 2.40E+01 | 4.24E+00 | |
| N2 | kmol/h | 2.42E+01 | 0.00E+00 | 0.00E+00 | 0.00E+00 | |
| CO2 | kmol/h | 2.85E+00 | 1.58E+00 | 2.40E-05 | 1.58E+00 | |
| H2S | kmol/h | 5.40E-04 | 2.99E-04 | 0.00E+00 | 2.99E-04 | |
| H2 | % | 50.00 | 94.71 | 99.9999 | 72.85 | |
| N2 | % | 44.72 | 0.00 | 0 ppm | 0.00 | |
| CO2 | % | 5.28 | 5.29 | 1 ppm | 27.14 | |
| H2S | ppm | 10 | 10 | 0 | 51 | |

It will be appreciated that the invention is not restricted to the details described above with reference to the preferred embodiments but that numerous modifications and variations can be made without departing form the spirit or scope of the invention as defined in the following claims.

The invention claimed is:

1. A method for concurrently producing power and $H_2$ from a gaseous mixture comprising $H_2$ and $CO_2$, the method comprising:
    feeding the gaseous mixture at super-atmospheric pressure to a first pressure swing adsorption (PSA) system comprising adsorbent that selectively adsorbs $CO_2$ at said pressure, and selectively adsorbing $CO_2$ from the gaseous mixture with said adsorbent and at said pressure, thereby obtaining an $H_2$-enriched mixture at super-atmospheric pressure;
    forming a fuel stream from a portion of the $H_2$-enriched mixture, combusting said fuel stream and expanding the resulting combustion effluent to generate power;
    feeding another portion of the $H_2$-enriched mixture at super-atmospheric pressure to a second PSA system comprising adsorbent that selectively adsorbs $CO_2$ at said pressure, and selectively adsorbing $CO_2$ from said portion of the $H_2$-enriched mixture with said adsorbent and at said pressure, thereby obtaining an $H_2$ product;
    desorbing $CO_2$ from the first PSA system, at a pressure lower than said pressure at which $CO_2$ was selectively adsorbed from the gaseous mixture to form a $CO_2$-enriched mixture; and
    desorbing $CO_2$ from the second PSA system, at a pressure lower than said pressure at which $CO_2$ was selectively adsorbed from the $H_2$-enriched mixture, to form an $H_2$ and $CO_2$-containing mixture;
    wherein all or a portion of the $H_2$ and $CO_2$-containing mixture is used as a purge gas for the first PSA system and/or is compressed and recycled to the first PSA system for further separation.

2. The method of claim 1, wherein the division of $H_2$-enriched mixture between forming the fuel stream and being fed to the second PSA system is adjustable, thereby allowing the proportion of the $H_2$-enriched mixture used to form the fuel stream to be increased by reducing the proportion fed to the second PSA system, and vice-versa, without halting the feed of the gaseous mixture to the first PSA system.

3. The method of claim 1, wherein the gaseous mixture further comprises $H_2S$, and the first PSA system comprises adsorbent that selectively adsorbs $CO_2$ and $H_2S$ at the super-atmospheric pressure at which the gaseous mixture is fed to the first PSA system, $CO_2$ and $H_2S$ being selectively adsorbed from the gaseous mixture with said adsorbent and at said pressure to thereby obtain the $H_2$-enriched mixture.

4. The method of claim 1, wherein the gaseous mixture comprises: about 30 to 75% mole % $H_2$, about 10 to 60% mole % $CO_2$; and about 0 to 2 mole % $H_2S$.

5. The method of claim 1, wherein the gaseous mixture is fed to the first PSA system at a pressure in the range of about 2-7 MPa (20-70 bar) absolute.

6. The method of claim 1, wherein the $CO_2$ recovery in the $H_2$-enriched mixture is at most about 30%, and the $H_2$ recovery in the $H_2$-enriched mixture is at least about 70%.

7. The method of claim 1, wherein the $H_2$-enriched mixture comprises greater than about 90 mole % $H_2$.

8. The method of claim 1, wherein the $H_2$-enriched mixture is obtained at a pressure which is the same or substantially the same as the super-atmospheric pressure at which the gaseous mixture is fed to the first PSA system.

9. The method of claim 1, wherein the $H_2$-enriched mixture fed to the second PSA system is cooled prior to being introduced into the second PSA system.

10. The method of claim 1, wherein the fuel stream is combusted and combustion effluent expanded in a gas turbine.

11. The method of claim 1, wherein the $H_2$-enriched mixture is combined with $N_2$ and/or steam to form the fuel stream.

12. The method of claim 1, wherein the $H_2$ product comprises at least about 99.9 mole % $H_2$.

13. The method of claim 1, wherein the $CO_2$-enriched mixture contains one or more combustible components, and at least a portion of said mixture is combusted in the presence of $O_2$ to produce a $CO_2$ product comprising combustion products of said combustible components.

14. The method of claim 13, wherein a portion of the $H_2$ and $CO_2$-containing mixture is combusted in the presence of $O_2$ to produce a $CO_2$ product comprising combustion products of $H_2$ and any other combustible components present in said mixture.

15. The method of claim 14, wherein the heat from combustion of said $CO_2$-enriched and $H_2$ and $CO_2$-containing mixtures is used to raise the temperature of the fuel stream formed from the $H_2$-enriched mixture, and/or to generate steam that is fed to a steam turbine to generate further power.

16. The method of claim 1, wherein a portion of the $H_2$ and $CO_2$-containing mixture is compressed and recycled to the second PSA system for further separation.

17. The method of claim 1, wherein a portion of the $H_2$ and $CO_2$-containing mixture is combusted, the resulting combustion effluent combined with the expanded combustion effluent obtained from the fuel stream formed from the $H_2$-enriched mixture, and the combined gases used to generate steam in a heat recovery steam generator.

18. The method of claim 1, wherein a portion of the $H_2$ and $CO_2$-containing mixture is compressed and added to the portion of the $H_2$-enriched mixture used to form the fuel stream.

19. Apparatus for producing power and $H_2$ from a gaseous mixture comprising $H_2$ and $CO_2$, the apparatus comprising:
- a first pressure swing adsorption (PSA) system, comprising adsorbent that selectively adsorbs $CO_2$ at super-atmospheric pressure;
- a conduit arrangement for feeding at super-atmospheric pressure the gaseous mixture into the first PSA system;
- a gas turbine for combusting a fuel stream and expanding the resulting combustion effluent to generate power;
- a second PSA system, comprising adsorbent that selectively adsorbs $CO_2$ at super-atmospheric pressure;
- a conduit arrangement for withdrawing at super-atmospheric pressure an $H_2$-enriched mixture from the first PSA system, introducing a fuel stream into the gas turbine formed from a portion of said $H_2$-enriched mixture, and introducing another portion of said $H_2$-enriched mixture into the second PSA system;
- a conduit arrangement for withdrawing an $H_2$ product from the second PSA system;
- a conduit arrangement for withdrawing a $CO_2$-enriched mixture from the first PSA system at a pressure lower than said pressure at which $CO_2$ was selectively adsorbed from the gaseous mixture;
- a conduit arrangement for withdrawing an $H_2$ and $CO_2$-containing mixture from the second PSA system at a pressure lower than said pressure at which $CO_2$ was selectively adsorbed from the $H_2$-enriched mixture; and
- a conduit arrangement (a) for introducing all or a portion of the $H_2$ and $CO_2$-containing mixture into the first PSA system as a purge gas for the first PSA system and/or (b) for introducing all or a portion of the $H_2$ and $CO_2$-containing mixture into a compressor and for recycling said compressed $H_2$ and $CO_2$-containing mixture to the first PSA system for further separation.

20. An apparatus according to claim 19, wherein said conduit arrangement for withdrawing from the first PSA system the $H_2$-enriched mixture, introducing into the gas turbine a fuel stream formed from a portion thereof, and introducing another portion thereof into the second PSA system, includes a valve system for adjustably controlling the division of the $H_2$ enriched stream between the gas turbine and second PSA system.

21. An apparatus according to claim 20, wherein said valve system is adjustable between a setting whereby all the $H_2$ enriched mixture is sent to the gas turbine and a setting whereby all the $H_2$ enriched mixture is sent to the second PSA system.

* * * * *